United States Patent [19]
Uchiyama et al.

[11] 4,264,120
[45] Apr. 28, 1981

[54] BEAM SCANNING DEVICE

[75] Inventors: Haruo Uchiyama, Kawasaki; Junichi Kimizuka, Tokyo; Kazuo Hoshido, Kawasaki; Yukio Isaka, Yokohama, all of Japan

[73] Assignee: Canon Kabushiki Kaisha, Tokyo, Japan

[21] Appl. No.: 45,436

[22] Filed: Jun. 4, 1979

[30] Foreign Application Priority Data

Jun. 8, 1978 [JP] Japan .................. 53-69279

[51] Int. Cl.³ .............................. G02B 27/17
[52] U.S. Cl. ........................ 350/6.8; 355/10; 358/199; 358/293
[58] Field of Search ............ 355/3 R, 10; 430/54, 430/125, 55, 67, 98, 902; 350/6.8; 358/199, 285, 293

[56] References Cited

U.S. PATENT DOCUMENTS

| | | | |
|---|---|---|---|
| 3,666,363 | 5/1972 | Tanaka et al. | 430/125 |
| 3,893,079 | 7/1975 | Shepard et al. | 350/6.8 |
| 3,922,485 | 11/1975 | Starkweather et al. | 350/6.8 |
| 4,059,833 | 4/1978 | Tanaka et al. | 354/9 |
| 4,071,361 | 1/1978 | Marushima | 430/54 |

*Primary Examiner*—John K. Corbin
*Assistant Examiner*—B. W. de los Reyes
*Attorney, Agent, or Firm*—Fitzpatrick, Cella, Harper & Scinto

[57] ABSTRACT

A beam scanning device provided with a beam generator to generate beam, a deflector to deflect the beam, and a beam detector to detect the deflected beam. In this beam scanning device, while the beam detector is detecting the beam with a definite cycle, the beam generator is so controlled that the beam may be generated therefrom with such definite cycle, and the beam is constantly generated from the beam generator when the beam detector becomes unable to detect the beam with such definite cycle. By thus controlling the beam generation, the beam detection can be carried out rapidly, even when the cycle for the beam detection shifts or noises enter during the beam detection.

13 Claims, 29 Drawing Figures

BEAM SCANNING DEVICE

BACKGROUND OF THE INVENTION a. Field of the Invention

This invention relates to a beam deflecting device to deflect a beam for irradiation onto a beam irradiating member. More particularly, the invention is concerned with a beam deflecting device having a beam detector to detect a position of the beam as deflected.

b. Description of Prior Arts

In a device for producing information outputs by scanning a beam irradiating member with a deflected beam, there is usually provided a beam detector in one part of a beam scanning path to render constant the position of the information output on the beam irradiating member. In other words, the starting position of the information output is determined by commencing modulation of the beam by an information signal in synchronism with a time, in which the beam is detected by the beam detector.

In the beam deflecting device using such beam detector, as the beam is detected in the above-described manner, a beam generator is so controlled that the beam may be emitted therefrom when the beam deflected by the deflector passes near-by the beam detector. With the beam deflecting device constructed as such, the beam detection signal output is produced at a predetermined time interval from the beam detector so far as the beam deflecting device operates regularly. By monitoring the time interval of this beam detection signal, therefore, it is possible to ascertain whether the beam deflecting device is operating regularly, or not. However, in the system of monitoring the time interval of the beam detection signal by emitting the beam only during a predetermined time period as mentioned above, a spurious beam detection signal is may be formed by noises, etc. to result in generation of an error signal, whereby accurate reinstating function cannot be imparted to the beam detector. For example, there exists a certain time period having no direct bearing on the recording operation after an information output is produced on one page until further information output is produced on a subsequent page, and also, in a state of waiting for an output, there is a time period which has no direct bearing on the recording operation. In case the abovementioned monitoring system is employed, if a spurious beam detection signal is detected during such time period, there is inevitably generated an error signal.

SUMMARY OF THE INVENTION

It is therefore the primary object of the present invention to provide a beam scanning device capable of immediately obtaining an accurate beam detection signal, even when a beam detection signal is not detected at a predetermined time interval.

It is another object of the present invention to provide a beam scanning device capable of readily obtaining an accurate beam detection signal, even when noises mix in the detection signal.

It is still another object of the present invention to provide a beam scanning device which is extremely simple in construction, and capable of forming the beam detection signal with high precision.

BRIEF DESCRIPTION OF THE DRAWINGS

FIGS. 1 through 4 illustrate a recording apparatus, in which the present invention is applied, and wherein FIG. 1 is a cross-sectional side elevation of the recording apparatus, FIG. 2 is a perspective view thereof, FIG. 3 is a top plan view of the recording apparatus.

FIGS. 11 and 11B are is a block diagram showing further details of an error detector in FIG. 7;

FIG. 19 shows the relative positions of FIGS. 19A and 19B;

DESCRIPTION OF PREFERRED EMBODIMENTS

In the following, a preferred embodiment of the present invention will be explained in reference to the accompanying drawings.

Figure 1:
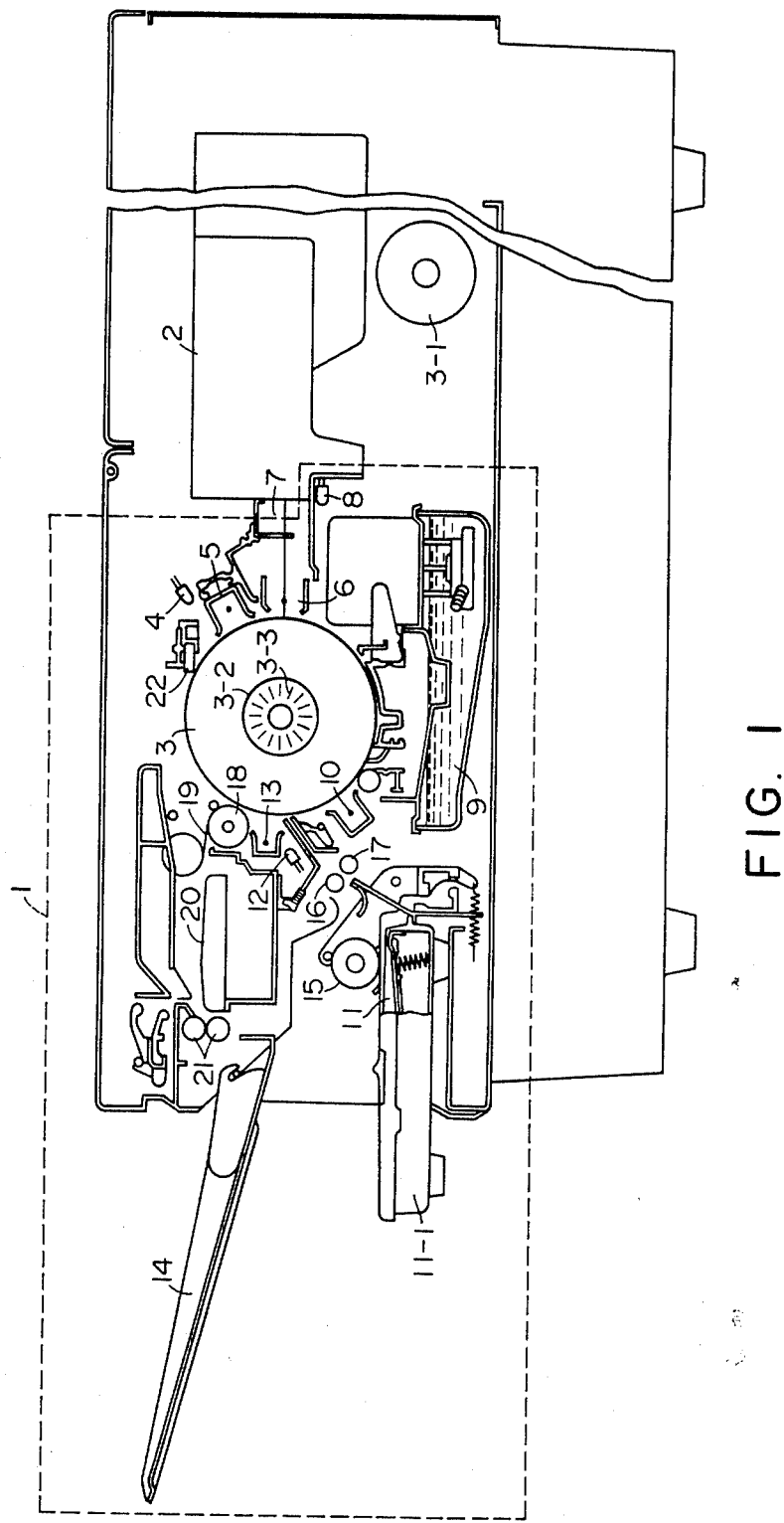

In FIG. 1, a reference numeral 1 designates a recording section utilizing an electrophotographic process, for which those devices as disclosed in U.S. Pat. Nos. 3,666,363 and 4,071,361, for example, may be used. Numeral 2 designates an optical section which emits laser light modulated by informations toward the recording section 1, and a numeral 3 refers to a photosensitive drum.

The recording operations are effected in such a manner that the surface part of an insulating layer of the drum-shaped photosensitive plate (i.e., the photosensitive drum) essentially construced with an electrically conductive body, a photoconductive layer, and the insulating layer is previously uniformly charged in either positive or negative polarity by a first corona discharger 5 to capture the electric charge in the opposite polarity to the abovementioned charge polarity within the photoconductive layer or in an interface between the photoconductive layer and the insulating layer, that a laser beam 7 is subsequently irradiated onto the surface of the charged insulating layer with simultaneous application of a.c. corona discharge by an a.c. corona discharger 6 to thereby form on the surface of the insulating layer a pattern created due to the difference in the surface potential in accordance with bright and dark pattern of the laser beam 7, that the surface of the insulating layer is then exposed uniformly by a lamp 8 to form an electrostatic image of a high image contrast on the surface of the insulating layer, that the thus formed electrostatic image is developed by a developer 9 with a developing agent principally consisting of electrically charged coloring particle to make it visible, and that, thereafter, the developed image is transferred by an image transfer charger 13 onto an image transfer material 11 such as paper, etc. through a positive (+) charger 10, at which time resistance in the photoconductive layer is lowered by means of an exposure lamp 12. The image transfer material 11, onto which the image has been transferred, is then separated from the photosensitive drum 3 by a separating belt 19 of a separator 18 followed by image fixation of the transferred image by an image fixing device 20 such as an infrared ray lamp, heat plate, etc., whereby an electrophotographic print image is obtained. The surface of the insulating layer after completion of the image transfer is subjected to cleaning by a cleaning device 22 to remove residual charged particles thereon, while the photoconductive layer is lowered its resistance by an exposure lamp 4 to be ready for subsequent use of the photosensitive drum.

A reference numeral 15 designates a paper forwarding roller which is constantly rotating. By lowering this paper forwarding roller 15 onto top surface of the image transfer material 11 laminated in a cassette 11-1, the image transfer material 11 is forward sheet by sheet along a conveying path. This image transfer material 11 is further forwarded to its image transfer position with a forwarding timing being taken by timing rollers 16, 17.

The image transfer material 11, on which the above-mentioned toner image has been transferred, is subjected to toner image fixation by the image fixing device 20, after which it is discharged into a paper receiving tray 14 by a pair of paper forwarding rollers 21, 21.

The photosensitive drum 3 consists of an endless photosensitive drum which is driven by a motor 3-1 through gears or pulleys, etc. (not shown). On one part of the photosensitive drum 3, a clock disc 3-2 is fixedly provided. By a lamp and a light receiving element which are so positioned as to holding the disc 3-2 therebetween, passage of light through slits 3-3 formed in the disc is detected to lead out clock pulses. Such clock pulses are generated 31.5 times for one rotation of the drum 3, and are used as the signals for controlling the electro-photographic process.

Figure 2:
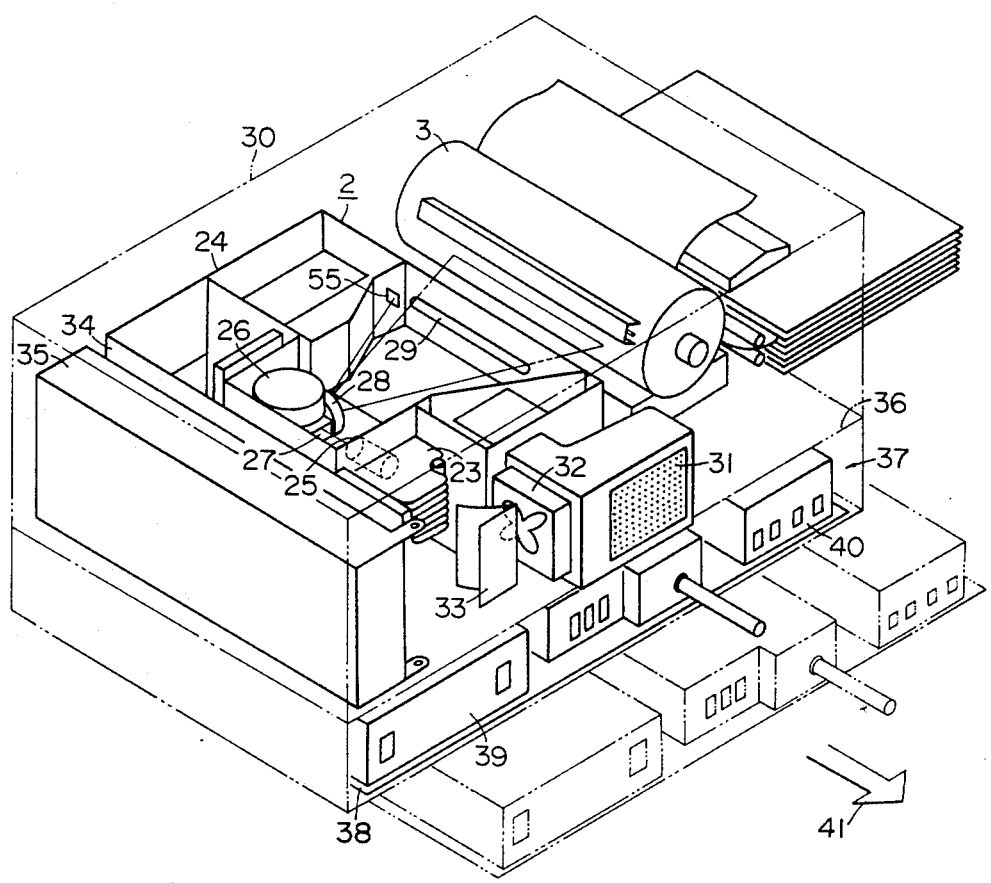

Referring now to FIG. 2, explanations will be given as to the surrounding of the recording section as well as the optical section 2 in the recording apparatus shown in FIG. 1. Outside a housing 24 for the optical section 2, there is fixedly provided a laser unit 23 having a semi-conductor laser element. Laser beam emitted from this laser unit 23 is projected into an incident window 27 of a deflector 26 through a beam expander optical system 25 fixed onto the housing 24.

The deflector is to deflect the incident beam by rotating a polygonal mirror such as, for example, a regular octagonal mirror, by a motor. The laser beam is deflected at an equal speed over the entire recording region on the photosensitive drum 3 by an f−θ lens 28 fixed on a projecting window of the deflector 26. A slit 29 for the deflected beam path is provided in the housing 24. In one part of a housing 30 enclosing the recording apparatus, there is formed an opening (not shown) in confrontation to a filter 31. Air which has been suctioned by a fan 32 and cleaned through this filter 31 is divided into two flowing directions by a damper 33. The air flowing in one direction cools the laser unit 23, while the air in another direction cools control circuit units 34, 35 in the recording apparatus. At the bottom part of the optical section 2, there is provided a power source section 37 separated from the optical section 2 by a separating plate 36. In this power source section 37, a low tension power source 39 and a high tension power source 40 are fixedly provided on a supporting table 38. By drawing the table 38 in the direction of an arrow 41-1. The power source section 37 can be taken out of the housing 30.

Further details of the optical section 2 will be given in reference to FIGS. 3 4A and 4B.

Figure 3:
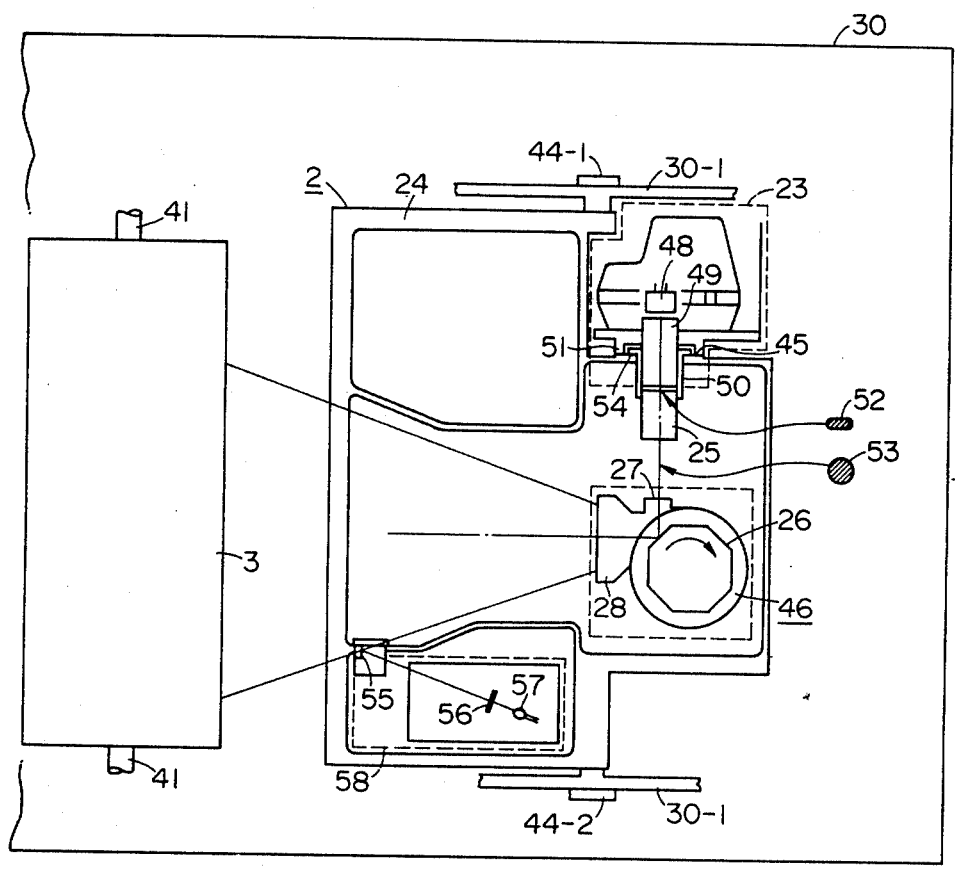
Figure 4A:
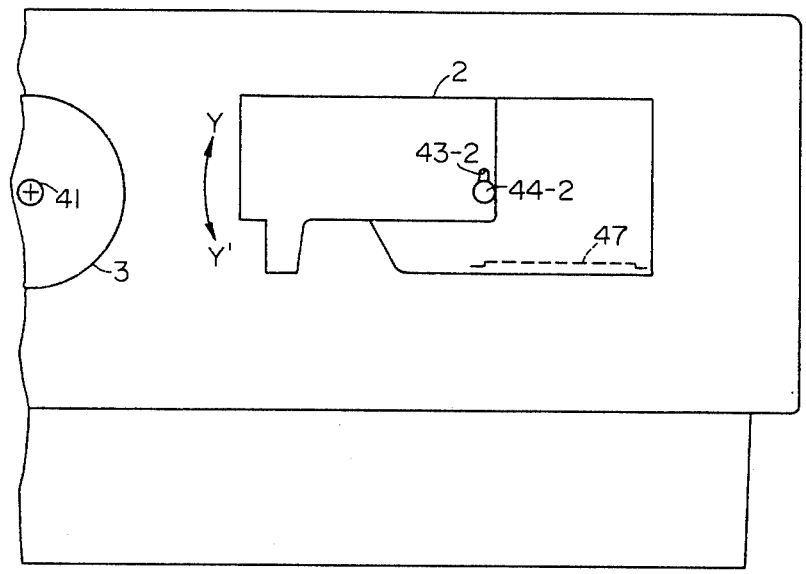
FIG. 4A is a side elevational view of the main part of the apparatus.

As shown in FIG. 3 which is a top plan view of the recording device to exhibit the optical section 2, the housing 24 for the optical section (or optical box) is disposed to the right side of the photosensitive drum 3 rotatably supported on a rotational shaft 41. All the component members to form the laser beam necessary for irradiating the photosensitive drum 3 are arranged in this optical box 24. Each of the units constituting the optical section is precisely adjusted and fixed at its determined position in the optical box 24 by means of a position determining means so that its function may be perfectly exhibited. Therefore, no adjustment is required once it is fixed in the box. This would provide good reproducibility in the fitting position of each unit when it is mounted and dismounted for cleaning mirror glass, and others as well as excellent exchangeability of the unit.

Figure 4B:
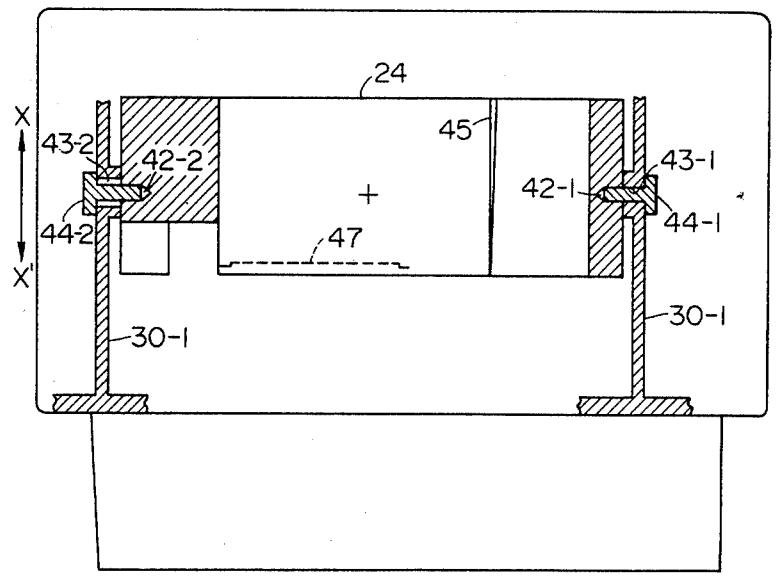
FIG. 4B is a backside view of the main part thereof.

Referring to FIG. 4B which is a backside view of the optical section in FIG. 3, the optical box 24 has two screw holes 42-1, 42-2 for oscillating the optical box. The center lines of these screw holes 42-1, 42-2 are almost aligned with each other, and are substantially parallel with the rotational shaft 41. In the abovementioned housing 30, there are fixedly provided frame 30-1, 30-1 for fixing the optical box 24. Holes 43-1, 43-2 are formed in the frames 30-1, 30-1 in correspondence to the screw holes 42-1, 42-2 in the optical box. The hole 43-1 corresponding to the screw hole 42-1 fits on the outer periphery of a threaded screw 44-1 to determine its screwing position, while the hole 43-2 corresponding to the screw hole 42-2 is a vertical slot, the short side of which fits on the outer periphery of a screw 44-2. Therefore, when the screws 44-1 and 44-2 are threaded into the screw holes 42-1, 42-2 through the frames 30-1, 30-1 fixed to the housing 30, the position of the optical box 24 can be moved in the direction of x-x' at the position of the screw 44-2. It is also possible that the optical box 24 is oscillated in the direction of y-y' in FIG. 4A, which is the side elevational view of the recording apparatus in FIG. 3, and is fixed at an arbitrary position with respect to the photosensitive drum 3. The optical box 24 fixes the laser unit 23 on its laser unit fixing surface 45, and a deflector unit 46 on its deflector unit fixing surface 47, and is moved in the directions of x-x' and y-y' so that the scanning position of the laser beam may come to a predetermined position of the photosensitive drum 3. When the predetermined position is attained, the optical box is firmly fixed to the frames 30-1, 30-1 by the threaded screws 44-1, 44-2.

A semiconductor laser device 48 is integral with a collimator lens 49 to constitute the laser unit 23. The semiconductor laser device 48 oscillates a laser beam modulated to strong and weak levels by external input signals received therein, and the laser beam enters into the collimator lens 49. Both semiconductor laser device 48 and collimator lens 49 are so adjusted by a jig that the laser beam may be aligned with the optical axis of the collimator lens and the light emitting surface thereof may coincide with the focal point of the collimator lens 49. (Further details of the laser unit will be described later.) By the adjustment of the semiconductor laser device and the collimator lens, the laser beam oscillated from the semiconductor laser device 48 passes through the collimator lens 49, after which it becomes parallel in alignment with the optical axis of the collimator lens. The laser unit 23 fits into a hole of a fitting ring 50 of the beam expander optical system 25 which in turn is fixed on the laser unit fitting surface 45 of the optical box 24 to determine its fitting position in the optical box 24 through an outer flange portion 51 having no eccentricity with the optical axis of the collimator lens 49. The parallel beam emitted from the collimator lens 49 is led to an incident opening of the beam expander optical system 25. The beam expander 25 is inserted for shaping the laser beam emitted from the collimator lens 49 and having a beam pattern as designated by a numeral 52 into a laser beam having a beam pattern as designated by 53 which is suited for image-formation on the photosensitive drum 3 as a spot light. However, since it is not indispensable, the beam expander may be eliminated depending on the situation. The beam expander 25 has an outer flange 54 which is fitted in the hole of the expander fitting ring 50 and has no eccentricity with the optical axis of the beam expander. By fitting this outer flange portion 54 with the abovementioned outer flange portion 51, the laser unit 23 is fixed at a predetermined position with respect to the beam expander optical system 25. Accordingly, the laser beam emitted from the collimator lens 49 automatically coincides with the optical axis of the beam expander 25, hence there is no necessity for alignment therebetween. Further, since the generatrix direction of the beam expander 25 is adjusted in advance at the time of its assembly for its positional relationship with a rotation preventive pin, there is no necessity for the post-adjustment when it is fitted onto the optical box 24.

Laser beam, which has been substantially horizontally scanned by the polygonal mirror 26 constituting the deflector and is emitted therefrom, is focussed on the photosensitive drum 3 as a spot light by means of the image-forming lens 28 having the $f-\theta$ characteristic. The polygonal mirror and the image-forming lens 28 are integrated to constitute the deflector unit 46. The deflector unit 46 is so adjusted by a jig that the scanning position of the laser beam on the photosensitive drum 3 may be at a certain predetermined height relative to the deflector unit fitting surface 47 and be in parallel with the fitting surface 47. The unit is positioned and fixed on the optical box 24 through the outer flange portion and the rotation preventive pin to be fitted into the hole perforated in the deflector unit fitting surface of the optical box 24.

The beam detector unit, although its details will be given later, consists generally of a single reflecting mirror 55, a slit plate 56 having a small incident slit, and a photoelectric conversion element (e.g., DIN diode) having a quick response time. The beam detector unit 58 detects the position of the laser beam to be scanned, and determines with this detection signal the start timing of an input signal to the semiconductor laser element for imparting desired light informations to the photosensitive drum 3, whereby shifting in synchronism of the signal in the horizontal direction due to irregularity in rotation of the polygonal mirror can be reduced to a large extent, an image of good quality can be obtained, and, at the same time, a permissible range of precision required of the polygonal mirror becomes broadened, which enable the apparatus to be manufactured at a low cost. The beam detector unit 58 is positioned by two positioning pins and mounted on the optical box 24.

The laser beam modulated in the abovementioned manner is then irradiated onto the photosensitive drum 3, and an image formed thereon is developed by the aforedescribed electrophotographic process, after which the developed image is transferred onto the image transfer material 11 such as plane paper followed by image-fixing, thereby producing a hard copy as the final output.

The optical section 2 constituting the present invention as mentioned above is so constructed that each of the entire units forming the same is appropriately adjusted to exhibit its function to the fullest extent, after which each of them is mounted on the optical box by means of a positioning device. Therefore, these component units do not necessitate any adjusting work after they are mounted, on account of which reproducibility of the position of each unit at its mounting and dismounting work as well as exchangeability of the component unit are excellent. Also, since the optical section 2 of this invention is of a simple construction, wherein no reflecting mirror other than the polygonal mirror is inserted in the light path to form the laser beam necessary for irradiating the photosensitive drum 3, the adjustment and assembly thereof are easy, and the light path fluctuate with least possibility due to vibrations, etc., which provides high reliability to the apparatus.

As mentioned above, the laser beam which has been scanned by the polygonal mirror is led to the beam detecting unit 58 including the reflecting mirror 55. The beam detecting unit 58 is equipped with the photoelectric conversion element 57, detects the position of the laser beam to be scanned, and with this detection signal, controls the start-timing for the input signal into the semiconductor laser element for imparting desired light informations onto the photosensitive drum 3. The photoelectric conversion element 57, however, has such a defect that it tends to readily bring about erroneous operations due to ambient electric noises. To avoid such disadvantages, the present device provides an electrical shielding around the photoelectric conversion element 57 to prevent such erroneous operation from taking place. Further, the photoelectric conversion element 57 and the beam detecting unit 58 are so positioned with respect to the optical box 24 that their positional reproducibility and exchangeability at the time of mounting and dismounting may be excellent.

Figure 5:
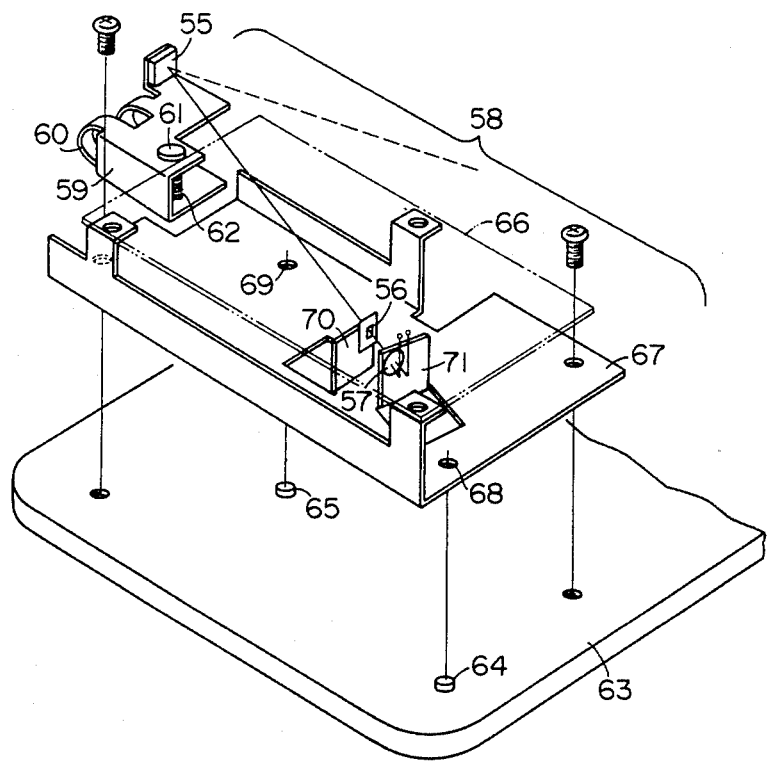
FIG. 5 is an enlarged perspective view showing a main part of a beam detecting unit in the recording apparatus of FIG. 2.

In the following, detailed explanations will be given as to the beam detecting unit 58 in reference to FIGS. 5 and 6. The reflecting mirror 55 is attached to a mirror holder 59. The laser beam scanned by the polygonal mirror is reflected by the reflecting mirror 55. The mirror holder 59 is capable of changing its position at its bent portion 60, so that the posture of the reflecting mirror 55 can be changed by an adjusting screw 61 and a spring 62, and firmly fixed at a desired position, whereby the laser beam reflected by the reflecting mirror 55 can be adjusted its in height with the light receiving surface of the photoelectric conversion element 57. On a beam detecting unit fitting surface 63 of the optical box 24, there are fixedly provided two positioning pins 64, 65. Also, in a base plate 67 for mounting a print base plate 66 including the photoelectric conversion element 57, there are formed a hole 68 to fit with the positioning pin 64 and a long hole 69, the minor axis of which fits with the positioning pin 65 and the major axis of which is directed to the center of the perforated hole 68. By means of these positioning pins 64, 65 and the holes 68, 69 corresponding thereto, the base plate 67 is accurately positioned and mounted on the optical box 24. On the base plate 67, there are provided two riser parts 70, 71 which are well positioned relative to the positioning holes 68, 69. The riser part 70 is to hold the small incident slit plate 56 for improving output waveforms of the photoelectric conversion element 57, while the riser part 71 is to hold the photoelectric conversion element 57.

Figure 6:
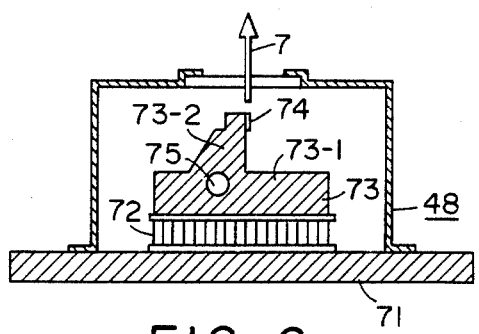
FIG. 6 is a side elevational view, in cross-section, of a semi-conductor laser device.

FIG. 6 shows a cross-sectional view of the semiconductor laser device 48 as applied to the present invention, in which a Peltier element 72 is fixed on the base plate made of a metal having good thermal conductivity, and a table 73 made of a metal of good thermal conductivity such as copper, etc. is fixed on this Peltier element 72. The base table 73 consists of a base part 73-1 coupled with the Peltier element 72 and a fitting part 73-2 projecting upwardly of the base part 73-1. At the tip end of the fitting part 73-2, there is provided a semiconductor laser element 74. A hole 75 is perforated between the base plate part 73-1 and the fitting part 73-2 of this base table 73. Into this hole 75, a part of whole of a temperature detecting element such as thermister, etc. (not shown) is imbedded, and the temperature of the semiconductor laser element 74 to be detected is controlled at a constant level by a Peltier element driving circuit 110 to be described later.

Figure 7:
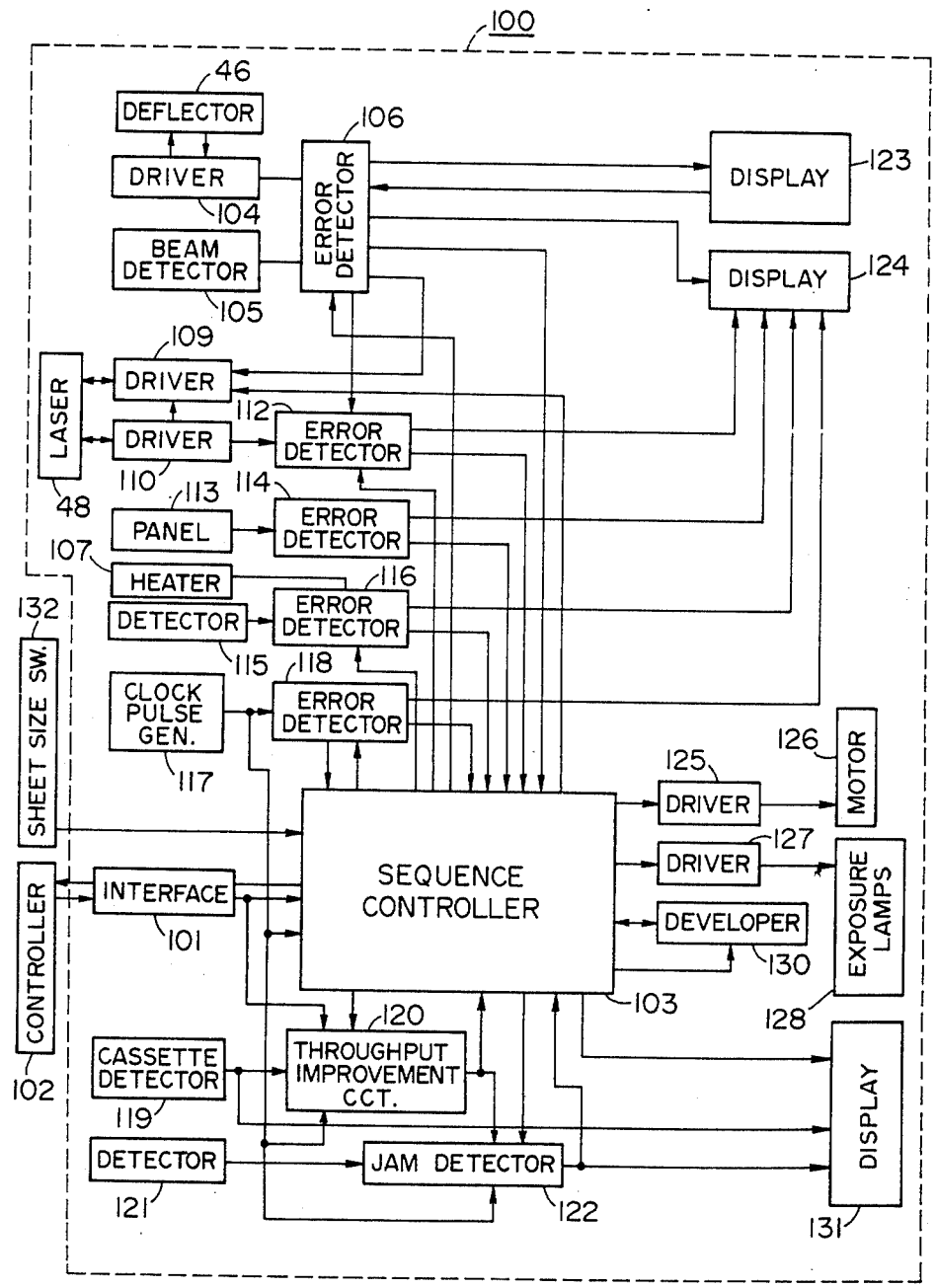
FIG. 7 is a block diagram showing a control section of the recording apparatus.
Figure 8:
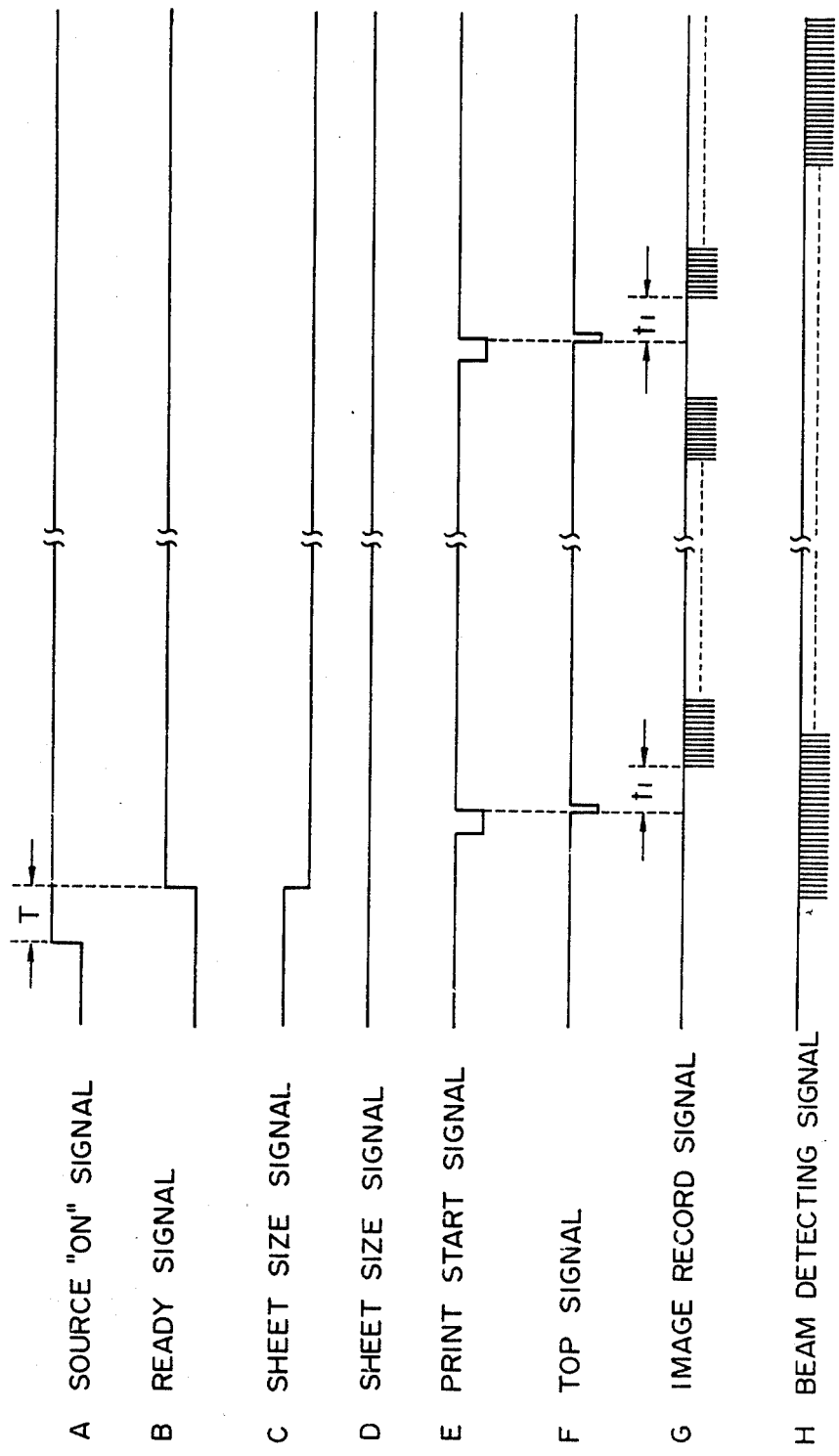
FIG. 8 shows output waveforms at each section in FIG. 7.

In the following, a control section 100 of the recording apparatus will be explained in detail referring to FIGS. 7 to 10. In FIG. 7, the deflector unit 46 is driven by a driving circuit 104 at a constant speed. A speed signal forwarded from the driving circuit 104 is applied to an error detector 106 to discriminate whether the deflector unit 46 is regularly rotating, or not. The result of this discrimination is applied to a display device 123 for visual indication. This result is also applied to a sequence controlled 103. The semiconductor laser device 48 including the semiconductor laser element 74, the Peltier element 72, and the thermister is so controlled by the Peltier driving circuit 110 that the semiconductor laser element may be maintained at a constant temperature level.

A temperature signal indicating the temperature of the semiconductor laser device 48 is applied to an error detector 112 to discriminate whether the semiconductor laser device 48 is at a predetermined temperature, or not. The result of this discrimination is applied to the sequence controller 103, and is displayed in a display device 124. With the emission of the laser beam from the semiconductor laser device 48 and the rotation of the delfector unit 46, the laser beam is detected by a beam detector 105 including the photoelectric conversion element 57, and the beam detection signal is forwarded to the error detector as well as to a controller 102 through the error detector 106, the print sequence controller 103, and an interface 101.

The error detector 106 discriminates whether the beam detection signal arrives at a predetermined time interval, or not, and applies the result of discrimination to the sequence controller 103, which is further displayed in the display device 124. This error detector 106 forms an unblanking signal for emitting the laser beam from the semiconductor laser device 48 so that the beam detector 105 may be able to detect the beam.

A recording signal forwarded from the controller 102 is applied to a laser driving circuit 109 through the interface 101, and the print sequence controller 103. The abovementioned unblanking signal is also applied to the laser driving circuit 109. Since the laser driving circuit 109 is to flow electric current through the semiconductor laser element in accordance with a signal applied thereto, the laser beam is emitted from the semiconductor laser element in accordance with the applied current. Such controller 102 is disclosed in U.S. Pat. No. 4,059,833, for example, hence detailed explanations thereof will be dispensed with.

A reference numeral 115 designates a detector for detecting temperature of the heater 107 constituting the image fixing device 20. The heater 107 is so controlled that, in accordance with the temperature detected by the detector, the image fixing device 20 may be maintained at a pre-determined temperature by a control detector 116. Also, detection is carried out as to whether the image fixing device 20 is at a predetermined temperature, or not, and the result of the detection is applied to the sequence controller 103, and displayed in the display device 124.

A reference numeral 117 designates a clock pulse generator which includes the afore-mentioned clock disc 3-2. Clock pulses generated in this pulse generator are applied to the print sequence controller 103 through an error detector 118. At the same time, discrimination is effected by this error detector 118 as to whether the clock pulses are regularly led out, or not, and the result of the discrimination is applied to the sequence controller 103 and displayed in the display device 124. Such clock pulses are applied to a throughput improvement circuit 120 and a jam detection circuit 122, both being described later in detail.

A numeral 126 refers to a.c. component parts such as a motor, a high tension power source necessary for the electrophotographic process, a paper feeding solenoid, and so on. Such a.c. components parts are driven by an output from a driving circuit 125 which is driven by the sequence controller 103.

A numeral 128 refers to a plurality of exposure lamps which are so controlled that they may be sequentially turned on by a sequential lighting circuit 127 which is controlled by the sequence controller 103.

A numeral 130 refers to a developing unit which detects a developing liquid level signal and a toner density signal and forwards these signals to the print sequence controller 103.

A reference numeral 113 designates a service panel including therein a cancel switch and a copy sheet counter. When the cancel switch is "on", it sends a cancel signal to the sequence controller 103 from an error detector 114 to stop operation of the recording apparatus, and, at the same time, sends the cancel signal to the controller 102 through the interface 101 to stop sending the recording signal. The error detector 114 also discriminates whether the copy sheet counter is operating regularly, or no, and, if not, sends out the cancel signal to the sequence controller 103, and this cancellation is further displayed in the display device 124 by the controller 103.

A reference numeral 119 designates a cassette detector which discriminated whether the cassette 11-1 accomodating therein the image forming material 11-1 is in a large, medium, or small size, based on which detection it leads out a cassette size signal. Furthermore, presence or absence of the image transfer material 11 in the cassette 11-1 is detected by a paper detector, and a cassette size signal and a paper presence signal are forwarded to the sequence controller 103, and displayed in a display device 131 by the sequence controller 103. While the cassette size signal is applied to the throughput improvement circuit 120, the circuit forms a signal to determine a space interval between one latent image and another to be formed on the photosensitive drum 3 by a paper size (large, medium small) signal to be applied thereto by the controller 102 through the interface 101 and the above-mentioned cassette signal. This interval determining signal is applied to the sequence controller 103 and the controller 102.

The paper cassette used in this embodiment is so constructed that three kinds of image transfer material (large, medium, and small sizes) may be stored in a cassette of one specific size (e.g., large-sized cassette). Therefore, the paper size should be designated in such a manner that the cassette size is first notified from the cassette main body, and then the paper size is designated by either the controller 102 or manual operation of a paper size switch 132.

A reference numeral 121 designates a discharged paper detecting circuit to detect that the paper as printed has been discharged into the paper receiving tray. By application of a gate signal to be determined by the detection signal in this circuit and the above-mentioned paper size signal to a detection circuit 122, discrimination is effected as to whether the image transfer material stays within the recording apparatus without reaching the discharge port of the apparatus or jammed at the discharge port. The result of this discrimination is forwarded to the sequence controller 103 and displayed in the display device 131 by the sequence controller 103. The abovementioned circuits 106, 112, 116, 118 are gated by timing pulses from the sequence controller 103, and detect errors.

In the above-described control section 100, when a power source "ON" signal as shown in FIG. 8A is emitted from the controller 102 or by a manual switch, the power source for the recording apparatus is turned on and each section of the apparatus starts its operation. The sequence controller 103 discriminates, after lapse of a time T (e.g., 60 seconds) from arrival of such power source "ON" signal, whether the detectors 106, 112, 114, 116 and 118 notify regular operations, the cassette detector 119 notifies presence of paper in the cassette, and the developing unit 130 notifies presence of developing liquid, normal toner density, and Jam-free state, or not. Whenever the entire detection signals are regular, it sends out a "ready" signal (a signal notifying completion of preparation) as shown in FIG. 8B to the controller 102, and displays this "ready" state in the display device 131. The time T is for warming-up of the recording apparatus, during which the deflector is brought to predetermined numbers of revolution, the image fixing device is brought to a predetermined temperature, and so forth. As soon as the controller 102 receives such "ready" signal, it sends out a paper size signal as shown in FIGS. 8C and 8D (2-bit construction) to the interface 101, and, at the same time, a print start signal shown in FIG. 8E is sent out to the sequence controller 103 through the interface 101. On the other hand, the sequence controller 103 forms a top signal shown in FIG. 8F by taking a synchronism with the clock pulse obtained at the clock pulse generator 117, and sends out this top signal to the controller 102. Such top signal is used as a vertical synchronization signal of an image to be formed on the photosensitive drum as well as a trigger signal for commencing operation of the sequential lighting circuit 127 in accordance with the electro-photographic process.

The controller 102 starts sending out the recording signal shown in FIG. 8G after lapse of a time $t_1$ from leading out of the top signal. This time $t_1$ determines a degree of blank portion (marginal space) formed in the top and bottom portions of the image transfer material. It should be noted here that the paper feeding signal is emitted after lapse of a certain predetermined time from leading out of the top signal. A beam detection signal shown in FIG. 8H is used as a horizontal synchronization signal of the image to be formed on the photosensitive drum 3. The abovementioned recording signal is sent out after lapse of a time $t_2$ from detection of this beam detection signal. This time $t_2$ determines a degree of marginal space to be formed at the left and right sides of the image transfer material. It should be noted that the time axis for the recording signal in FIG. 8G is illustrated in a remarkably reduced scale, in which more than 2,000 bits of recording signal are actually sent out during one cycle of the beam detection signal. Thus, the recording signal forwarded to the sequence controller 103 is applied to the abovementioned laser driving circuit 109 to control emission of the laser beam.

When the recording apparatus brings about paper jam during the recording operations, the sequence controller 103 stops the print sequence with this jam signal, calculates the number of the image transfer material staying in the recording apparatus, and demands the controller 102 for re-sending of the recording signal for the previous page of the original corresponding to the jammed number of sheet.

Figure 9:
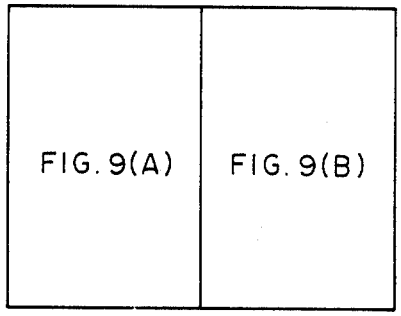
FIG. 9 shows the relative positions of FIGS. 9A and 9B.
Figure 9A:
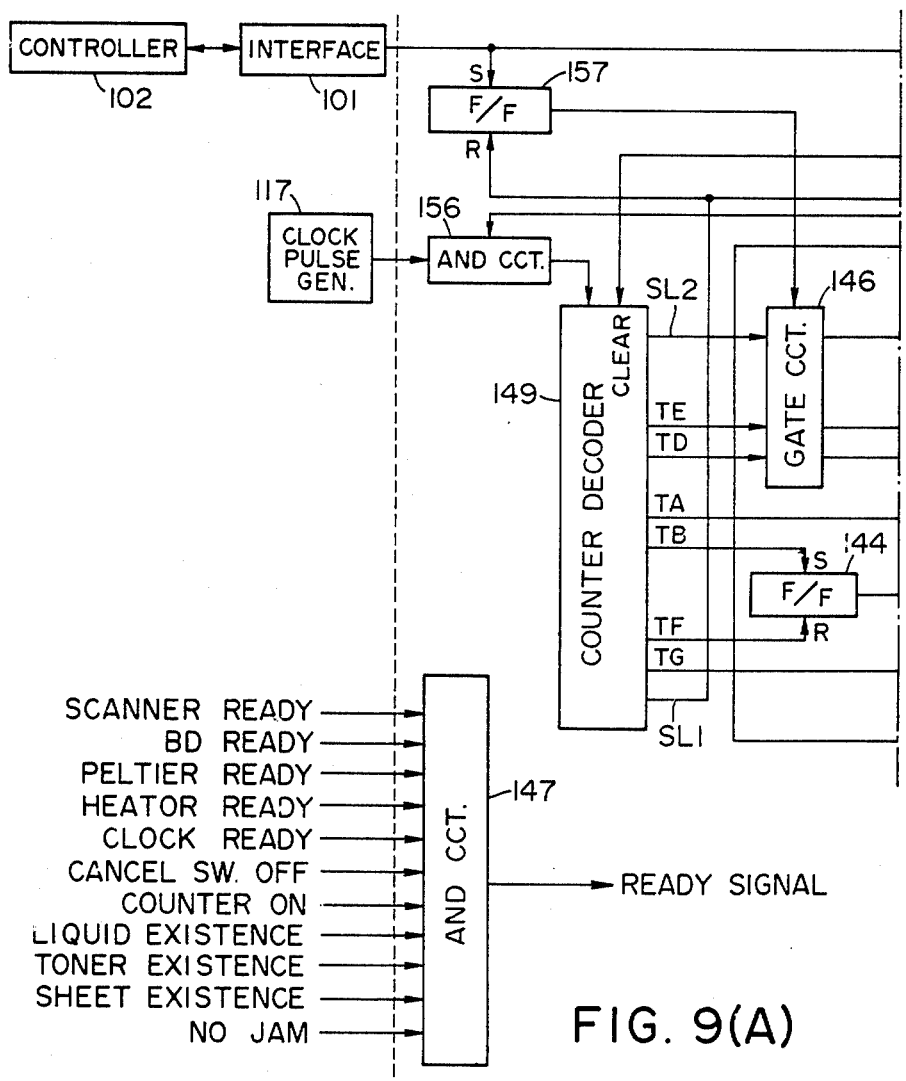
FIGS. 9A and 9B are a block diagram showing further details of a sequence controller in FIG. 7.
Figure 9B:
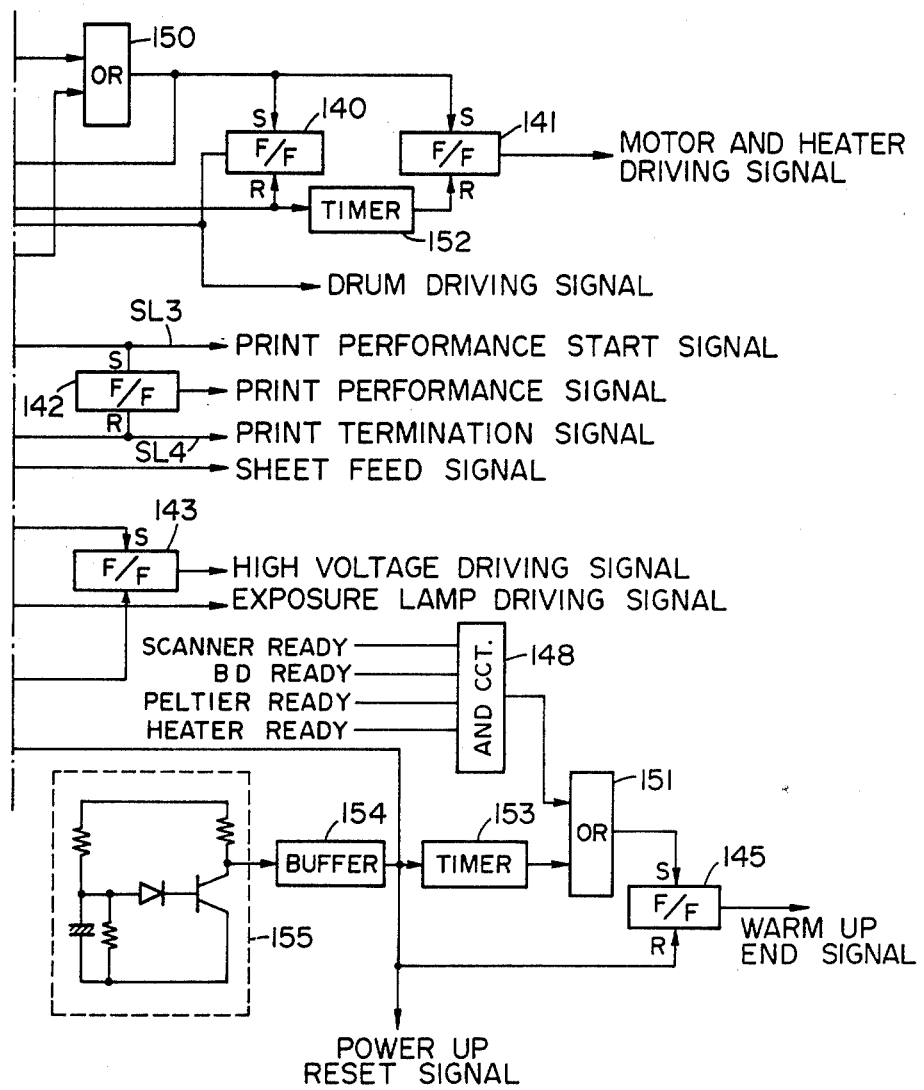
Figure 10:
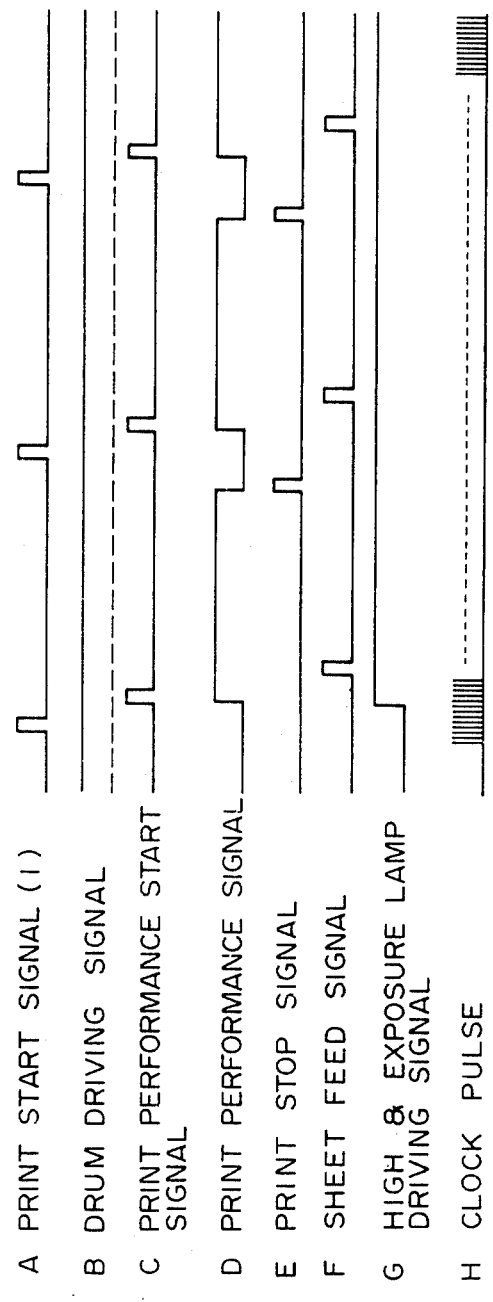
FIG. 10 shows various output waveforms at every part in FIG. 9.

Further details of the sequence controller 103 will be given hereinbelow. FIGS. 9A and 9B are a more detailed block diagram of the sequence controller, and FIG. 10 shows its timing chart. The sequence controller 103 is constructed with flip-flops 140 to 145 and 157, a gate circuit 146, "AND" circuits 147, 148 and 156, a counter-decoder 149, "OR" circuits 150 and 151, timers 152 and 153, a buffer circuit 154, and a power-up reset circuit 155.

When the power source of the recording apparatus is turned on by the abovementioned power source "ON" signal, one reset pulse output is produced from the power-up reset circuit 155. This circuit 155 is an integration circuit using a known CR. The reset pulse passes through the buffer circuit 154 and is fed to each section as the power-up reset signal. This reset pulse is also introduced as an input into the "OR" circuit 150. The output from the "OR" circuit sets the flip-flop 141, and the output therefrom is sent into the a.c. component parts driving circuit 125 (FIG. 7) as an input to thereby feed power to these a.c. component parts. The output from the "OR" circuit 150 is also introduced as a set input into the flip-flop 140, and a set output from the flip-flop 140 is applied to the "AND" circuit 156 to turn on the circuit, as the result of which a clock pulse as shown in FIG. 10H is sent out to the counter-decoder 149. At the same time, the output signal from the flip-flop 140 becomes a drum driving signal to rotate the same. By the way, since the flip-flop 157 is not set, the gate circuit 146 remains closed. The output from the "OR" circuit 150 is introduced as an input into the counter-decoder 149 to clear the counter in the counter-decoder 149. The counter-decoder 149 consists of a counter, a decoder and an "OR" circuit, and counts clock pulses from the clock pulse generator 117 to form various driving signals necessary for performing the electrophotographic process. For instance, it sets the flip-flop 143 with a TA timing, and resets the same with TG timing. This signal becomes a high tension drive signal. It also sets the flip-flop 144 with a TB timing, and resets the same with a TF timing. This signal becomes an exposure lamp drive signal. In this way, after the required pre-treatments for the electrophotographic process have been done, if no print start signal arrives, a drum stop signal output is produced from a signal line SL1 of the counter-decoder 149 to reset the flip-flops 157, 140 and set the timer 152. By resetting of the flip-flop 140, the drum stops, and the "AND" circuit 156 is turned off. Also, the timer 152 starts as mentioned above to reset the flip-flop 141 after lapse of a certain definite time, e.g., 60 seconds whereby the current supply to the a.c. component parts is stopped and they are turned off. The output signal from this timer 152 is called "automatic shut-off signal".

A reference numeral 147 designates an "AND" circuit to form the abovementioned "ready" signal for the recording apparatus. The input signal for this "AND" circuit are a scanner ready signal, a beam detect (BD) ready signal, a Peltier ready signal, a heater ready signal, a clock pulse ready signal, a cancel switch off signal, a signal for notifying that the counter is regularly connected, a signal notifying presence of developing liquid in the liquid developing device, a signal notifying presence of toner, a signal notifying presence of paper in the cassette, and a signal notifying absence of paper jam within the recording apparatus. Only when all these signals have reached the "AND" circuit, it emits a recording apparatus ready signal. On the other hand, the powerup reset signal sets the timer 153. The timer 153 may be set at the maximum values of the warming-up time for various devices constituting the recording apparatus, for example. An output from this time 153 is introduced as an input into the "OR" circuit. The other input into this "OR" circuit 151 is an output signal from the "AND" circuit 148, to which the scanner ready signal, the BD ready signal, the Pelitier ready signal, and the image fixing heater ready signal have been applied. The output signal from the "OR" circuit 151 sets the flip-flop 145. The set output signal from this flip-flop 145 is a waming-up and signal which is sent out to each of the error detecting circuits shown in FIG. 7 as the timing signal for examining the above-mentioned ready states. The flip-flop 145 is reset by the power-up reset signal.

When the condition for readiness in each of the component devices are met and the ready signal from the "AND" circuit 147 is forwarded to the controller 102 through the interface 101, a print start signal as shown in FIG. 10A (which is the same as that shown in FIG. 8E) is sent from the controller 102. The print start signal sets the flip-flop 157, the set output signal of which is sent to the gate circuit 146 to open it. On the other hand, the print start signal is also introduced as an input into the "OR" circuit 150. An output from this "OR" circuit 150 is applied to the flip-flops 140, 141, as is the case with the afore-mentioned power-up reset signal, to set the same. However, since these flip-flops have already been set, there takes place no change in these flip-flops. Further, an output from the "OR" circuit 150 clears the counter-decoder 149 which, in turn, starts counting of the clock pulses, whereby the electrophotographic process commences. With an output signal TA from the counter-decoder 149, the exposure lamp driving signal output is produced, while the high tension circuit driving signal output is produced with an output signal TB from the counter-decoder. Subsequently, a print performance start signal as shown in FIG. 10C (to be led out on a signal line SL2) is produced as an output on a signal line SL3 through the gate circuit 146 to simultaneously set the flip-flop 142, a set output of which becomes a print performance signal shown in FIG. 10D. The counter-decoder 149 produces a print end signal output shown in FIG. 10E with a timing TE on a signal line SL4 through the gate circuit 146 to reset the flip-flop 142 and to turn off the print performance signal. The counter-decoder 149 produces a paper feeding signal output shown in FIG. 10F with a timing TD. As shown in FIG. 10, when the print start signal arrives in succession, the counter-decoder 149 is cleared through the "OR" circuit 150. As the consequence of this, the sequence similar to that mentioned above commences, taking the timings as shown in FIG. 10.

When the subsequence print start signal arrives before the timings TF, TG, the flip-flops 143, 144 are not reset, but are continuously driven as shown in FIG. 10G. Since the timings TA, TB, TD, TE, TF, and TG are determined by the electrophotographic process, it may be permissible if TA=TB or TF=TG. Moreover, in the timing chart in FIG. 10, a time interval from the print start signal to the print performance signal, or a time interval from the print start signal to the paper feeding signal is determined by a mechanical distance between the printing device main body and the paper cassette, the conveying system, the photosensitive drum, and the exposure charger.

As stated in the foregoing, the driving signal necessary for the electrophotographic process and signals necessary for various error detecting circuits are produced by the sequence controller 103. By the way, in the embodiment shown in FIGS. 9A and 9B, the scanner has been explained to be in constant rotation after turning on of the power source. It is however possible that the scanner is so constructed as to be stopped when no recording operation is effected over a long period of time, even when the power source is on.

Figure 20:
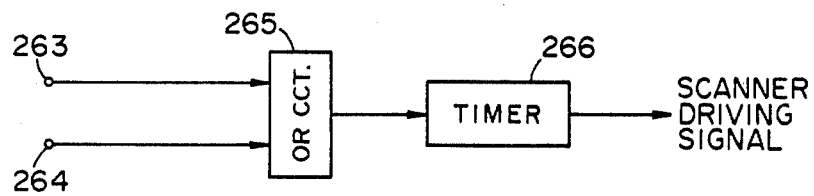
FIG. 20 is a schematic circuit block diagram to form a scanner driving signal.

FIG. 20 illustrates such an embodiment, wherein the power-up reset signal shown in FIG. 9B is applied to a terminal 263, the print start signal is applied to a terminal 264, and these two signals are applied to a timer 266 as an actuating signal for the timer through an "OR" circuit 265. The timer 266 is such one that uses, as a set time, a timer $\tau_2$ (e.g., 10 min.) which is longer than a time $\tau_1$ after the power source is closed until the warm-up end signal is led out. It usually leads out a high level signal, although its output changes to a low level signal owing to lapse of a time $\tau_2$ since application of the actuating signal from the "OR" circuit 265. Accordingly, with use of the output from this timer 266 as the scanner driving signal, the scanner can be automatically stopped, when the printing operation is not performed over a long period of time. In more detail, the timer 266 is actuated by application of the power-up reset signal, but it is reinstated to the initial state by application of the print start signal as the exciting signal prior to counting of the time $\tau_2$ by this timer 266. Therefore, so far as the print start signal is applied with a time interval shorter than the time $\tau_2$, the timer 266 leads out the high level signal, and the scanner continues its rotation. And, until lapse of the time $\tau_2$ from application of a certain print start signal, if there takes place a situation, in which the subsequent print start signal is not applied, the output from the timer 266 changes to a low level signal to stop rotation of the scanner. Concrete example of this will be shown in FIG. 21 in respect of the display devices 123, 124 and 131 in FIG. 7.

Figure 21:
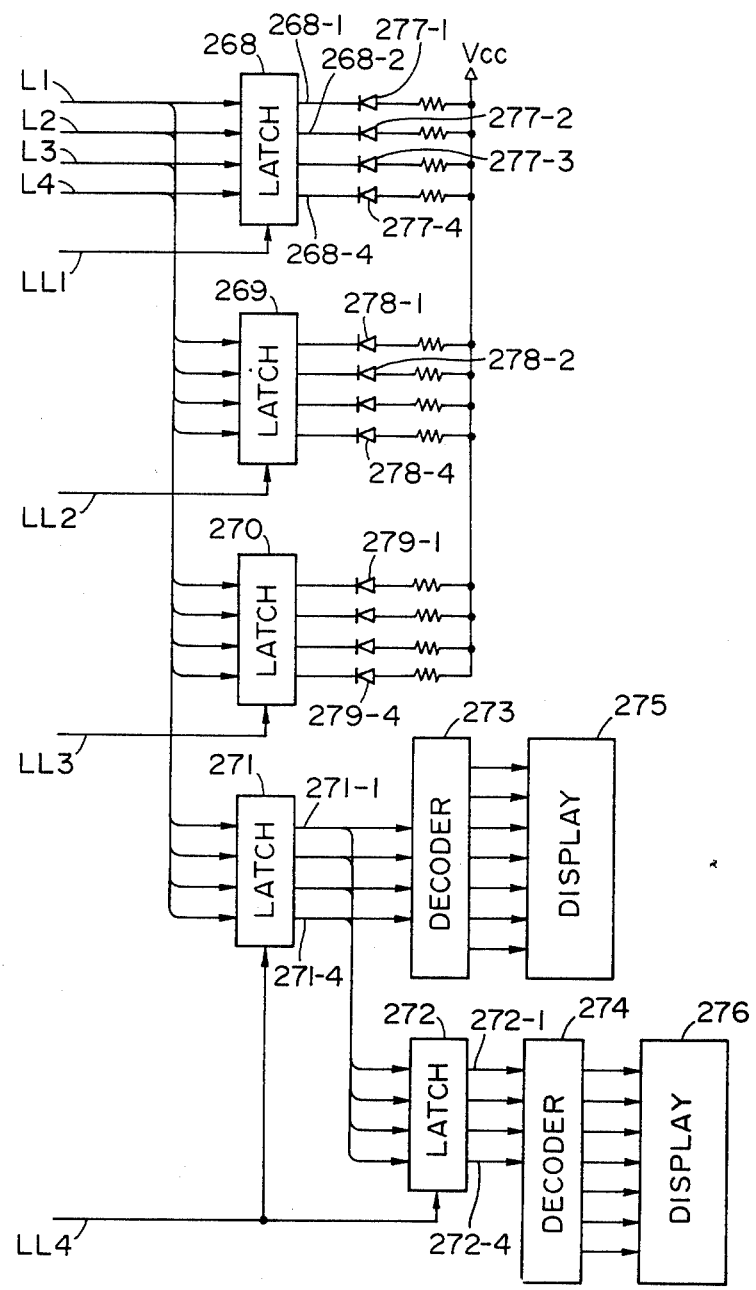
FIG. 21 is a block diagram showing a display driving circuit.

In the drawing, reference numerals 268 to 272 designate latch circuits, numerals 273, 274 refer to decoder circuits, and numerals 275, 276 refer to light emitting diodes (LED) to display numerals "6" to "9" and alphabetical letters "A" to "F", which constitutes the display device 131 in FIG. 7. Numerals 277 to 279 refer to light emitting diodes just for lighting, and they constitute the display devices 123, 124. The input signals into the "AND" circuit 147 in FIG. 9A are divided into three sets of the first data, the second data and the third data, and these sets of input signals are latched by any of the latch circuits 268 to 270 through signal lines L1 to L4. On the other hand, the status within the sequence controller 103 is latched in the latch circuits 271, 272. That is, the sequence, in which sequence controller 103 stays, is latched. In this case, the signals on the signal lines L1 to L4 are forwarded in the form of 4-bit codified signals. For example, the print sequence is precisely classified such as "in print", "in wait", "in automatic shut-off", and, the "in print" state is even sub-divided "in agitation of the developer", "in drum cleaning", "in exposure lamp on", "in papar feeding", etc. in the course of the electrophotographic process. Such states are rendered 4-bit codified signals to be sent together with the latch signal from the sequence controller 103 to the display devices. In FIG. 21, the latch circuit 271 denotes the present status of the sequence controller, and the latch circuit 272 represents a previous status thereof immediately before the present status. The codified signals latched by the latch circuits 271, 272 are decoded by the decoders 273, 274 and displayed in the display devices 275, 276 in any forms of 16 kinds of patterns covered by "6" to "9" and "A" to "F".

Figure 22:
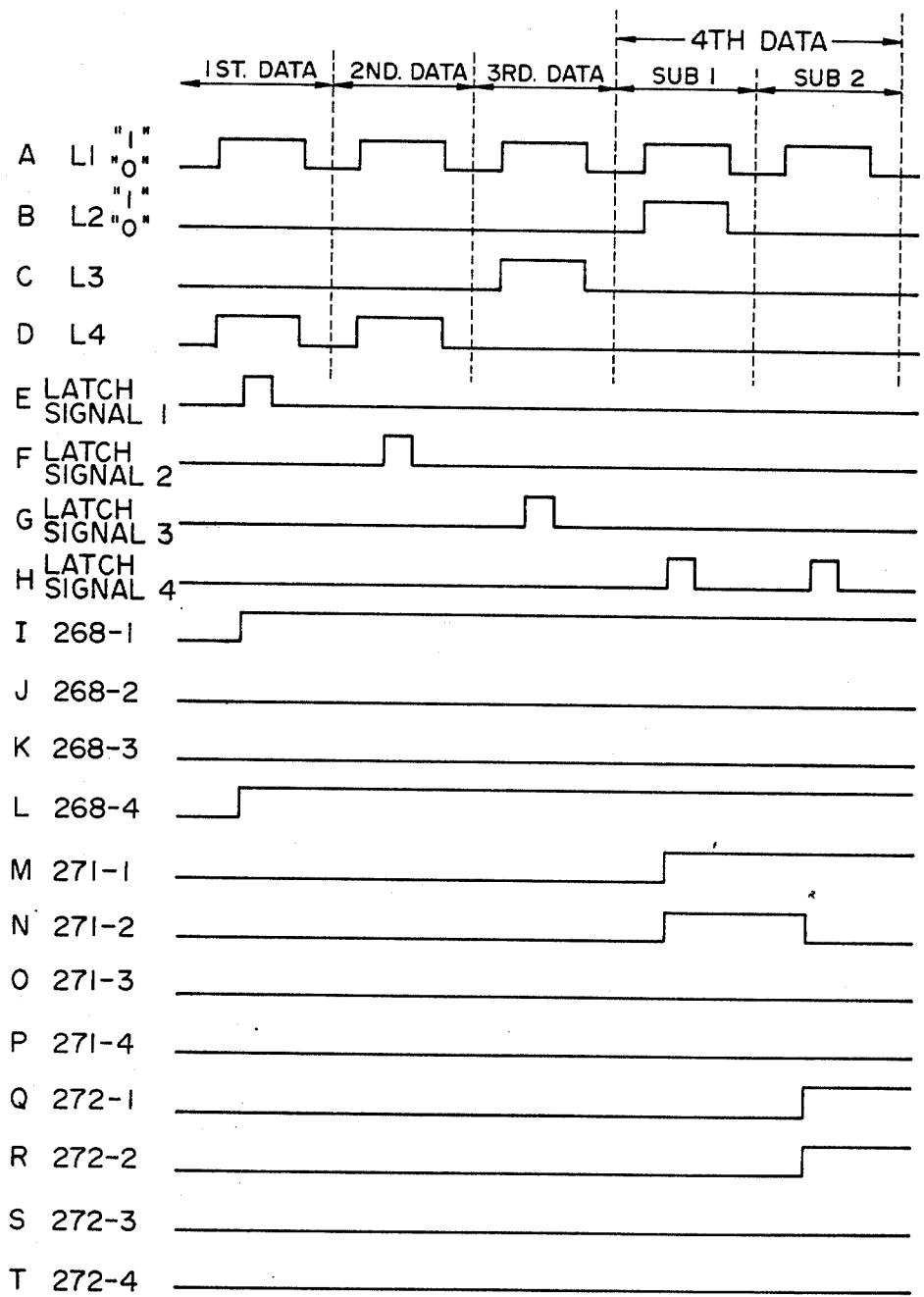
FIG. 22 shows various waveforms in the circuit of FIG. 21.

Explaining the above in more detail in reference to the timing chart in FIG. 22, those data as shown in FIGS. 22A to 22D are sequentially forwarded to the signal lines L1 to L4. Accordingly, when those latch signals shown in FIGS. 22E to 22H are applied to the latch signal lines LL1 to LL4 to instruct the respective latch circuits to latch the data, the first data are stored in the latch circuit 268, the second data are stored in the latch circuit 269, the third data are latched in the latch circuit 270, and the fourth data are latched in the latch circuits 271, 272. For example, if the Peltier ready signal is led out to the signal line L1 in the first data, the image fixer ready signal is led out to the signal line L2, the clock ready signal is to the signal line L3, and the toner presence signal is to the signal line L4, the above-mentioned first data are latched by the latch circuit 268 by the latch signal 1, whereby the signal lines 268-1 to 268-4 take the signal level as shown in FIGS. 22I to 22L. As the result, the LED's 277-2, 277-3 are lighted, notifying that the image fixer and clock are not in the ready state. In the similar manner, the latch circuits 269, 270 respectively latch the second and third data, and turn on the LED's in accordance with the latched contents, and notify the present status. The fourth data are applied to the signal lines L1 to L4 as the codified signals, as mentioned above. However, by application of the latch signal 4 as shown in FIG. 22H to the signal line LL4, the signal level in the output lines 271-1 to 272-4 of the latch circuit 271 becomes as shown in FIGS. 22M to 22P, and the signal level in the output lines 272-1 to 272-4 of the latch circuit 272 becomes as shown in FIG. 22Q to 22T. The fourth data (2) and (1) respectively stored in the latch circuits 271, 272 are decoded by the decoders 273, 274, the decoded contents of which are displayed in the display devices 275, 276.

In the following the self-examining functions of the recording apparatus will be explained in detail. The self-examining functions of the recording apparatus are broadly classified into four as follows: (1) self-examination as to shortage of supplies such as shortage in the developing liquid, paper exhaustion, empty toner bottle, etc.; (2) self-examination as to temporary erroneous operations such as paper jamming, misprint, etc.; (3) self-examination as to disorder in the constituent elements or circuits such as disorder in the scanner, insufficient beam detection, insufficient temperature control of the Peltier element, disorder in the image fixer, disorder in the drum clock, disconnection of the counter, and so on; and (4) self-examination as to the operator's manipulations such as cancel switch "on", test switch "on", and so forth.

(1) The self-examination as to shortage of the supplies is for promptly performing replenishment of the short supplies.

(2) The self-examination as to the temporary erroneous operations is to notify the operator of the paper jamming, misprint, etc. when they occur so that such jammed paper and misprint sheet may be quickly removed by the operator and the operations may be reinstated to the normal state.

(3) The self-examination as to disorders in the constituent elements or circuits is to search out the disordered element or circuit and display them on the display device so that the disordered unit may be readily exchanged, and the downtime of the apparatus may be reduced.

(4) The self-examination as to the operator's handling is to eliminate any mal-operations by the operator such as depression of improper switch by clearly pointing it out to the operator.

In addition to these self-examinations of the recording apparatus as mentioned in the above (1) to (4), it also performs general examination to display on the display device 131 whether the recording apparatus is in the waiting state at present, or in its ready state, or in its error state, and so on. By the waiting state, it is meant that, during the warming-up of the recording apparatus, or when the recording apparatus is left inoperative over a long period of time without performing the recording operation with the power source being in the "on" state, the automatic shut-off function is effected to automatically shutt off the power source connection to the unnecessary electrical parts. This is displayed by a wait lamp in the display device 131. By the ready state, it is meant that the printing operation can be performed at any time after termination of the warming-up of the apparatus in a state of any erroneous operation or misprint having been detected as the result of individual self-examination. This is displayed by a ready lamp in the display device 131. The error state is such one that, as the result of the self-examination, errors have been detected. This is indicated by on-and-off of an error lamp in the display device 131 or diplay devices 123, 124.

By carrying out such general and individual self-examinations, the downtime of the recording apparatus is reduced to improve its utility, the copy service is performed with less difficulty to lower the cost for the service, and the apparatus is made easy to operate for the operator.

Figure 11:
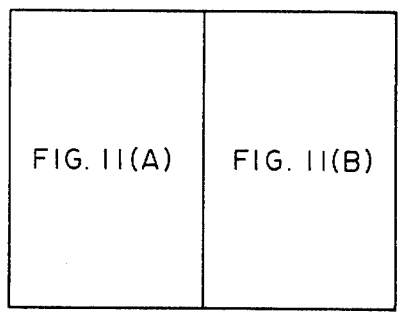
FIG. 11 shows the relative positions of FIGS. 11A and 11B.

In the following one embodiment of the self-examination functions of the recording apparatus according to the present invention will be explained in details in reference to the drawing. First of all, the error detection circuit 106 which detects the scanner errors and the beam detection errors will be explained in accordance with the block diagram in FIG. 11. This error detection circuit 106 detects whether the scanner and beam detection signals have become ready within a defined time after the power-on, or not. When the detection signals are ready, the circuit generates a ready signal. When, during the printing operation, the scanner becomes out of its regular rotation, or the beam detection signal (hereinafter abbreviated as "BD signal") gets out of its regular cycle, the error detection circuit 106 generates a scanner error signal or BD error signal, and holds them.

When the scanner reaches its predetermined number of rotation, the high level scanner ready signal to be generated therefrom enters into a gate 201 through a terminal 200. In this instance, when a warm-up end signal to be led out by termination of the warming-up operation of the recording section 1 is applied to a terminal 202, the gate 201 is opened, and the scanner ready signal passes through the gate 201, is displayed in the display device 124 to notify the scanner ready state, and then enters into a scanner error hold flip-flop 205.

On the other hand, a high level print performing signal to be led out during the printing operation is applied to a terminal 206, and passes through an "OR" circuit 207 to enter into the clear terminals of the flip-flip 205 and a BD error hold flip-flop 208. Therefore, the abovementioned flip-flop 205, 208 are made operable only during the print performance (i.e., while the print performing signal is being led out), and are cleared in the remaining period. However, when the scanner error or the BD error are generated, measures are taken so that the error signals may not be detected by the sequence controller 103 to hold the print performing signal and to clear the flip-flop 205, 208. In this case, clearance of the flip-flops is done by turning on of a re-starting switch 209 and applying a low level signal to the abovementioned clear terminals through the "OR" circuit 207. The flip-flop 205 is added with a signal, as a clock signal, obtained by dividing an output (FIG. 4A) from a crystal oscillator 210 (having an oscillation frequency of 1 MHz) into approximately 244 Hz through a frequency divider 211. Accordingly, the flip-flop 205 introduces the scanner ready signal only during the print performance in synchronism with the abovementioned clock signal, and holds the state as soon as the signal to the terminal assumes a high level (when it detects errors) even once.

Figure 12:
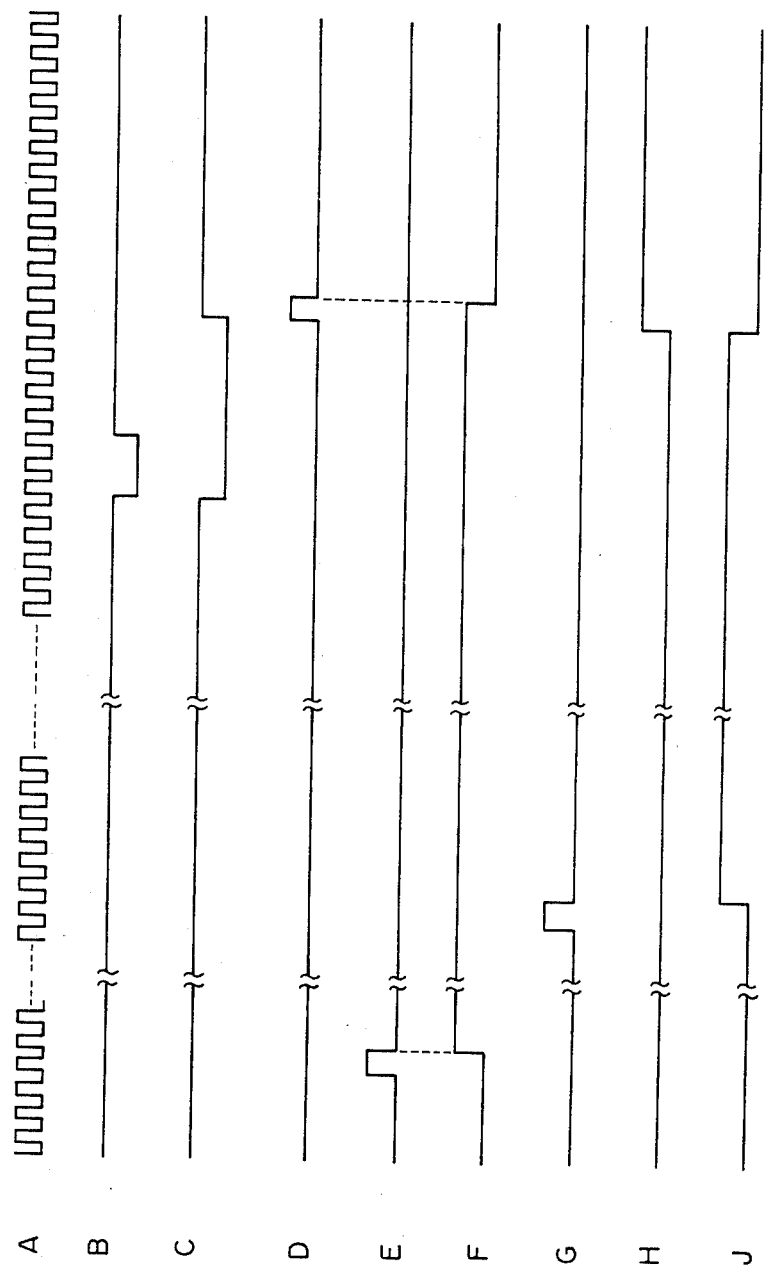
FIGS. 12 and 13 show various output waveforms at every part in FIG. 11.

The BD signal to be applied to a terminal 212 consists of pulse signals as shown in FIG. 12B, triggers a one-shot multivibrator 213, and generates pulse signals of a certain definite breadth as shown in FIG. 12C. While such pulse signal having a certain definite breadth is further applied to a synchronous single pulse generator 214, this pulse generator 214 generates a single pulse as shown in FIG. 12D synchronized with the pulse signal oscillated from the abovementioned crystal oscillator 210 at the time of rising of the pulse signal led out of the one-shot multivibrator 213. The pulse signal generated from the pulse generator 214 passes through an "OR" circuit 215 and is applied to a synchronous clear input of a counter 216. This counter 216 counts an output from the above-mentioned crystal oscillator 210 (having oscillation frequency of 1 MHz). The counting operation starts from a time instant when it is cleared with the pulse from the pulse generator 214 synchronized with the BD signal. The counter 216 produces a pulse output shown in FIG. 12E when it has counted 1360 output pulses from the crystal oscillator 210. The pulse E enters into a J-input of a J-K flip-flop 217 which generates an unblanking signal to cause the unblanking signal shown in FIG. 12F to rise. Next, when the counter counts 1856 pulses, it produces an output pulse G shown in FIG. 12G. The pulse enters into a J-input of a J-K flip-flop 218 which generates a signal to determine a permissible range of the BD signal, and causes the BD permissible range signal to rise. This BD permissible range signal is trailed when an output from the pulse generator 214 or 1888 pulse count output from the counter 216 is led out through the "OR" circuits 215, 221. When the one-shot multivibrator 213 changes from the low signal level to the high while the BD permissible range signal is at its high signal level, it emits the BD ready signal, the permissible range of which is from 1856 to 1888 counts by the counter 216. In this range for the count, when the pulse D is generated from the pulse generator 214 to clear the counter 216 and the flip-flop 218, they are cleared before the counter 216 produces its 1888 count output. Such BD permissible range signal is applied to a flip-flop 219, to the clock terminal CK of which an output from the one-shot multivibrator 213 is applied, and to the clear terminal CL of which the 1888 count output to be led out on a signal line 220 of the counter 216 is applied. Therefore, when an output is led out of the one-shop multivibrator 213 before the counter 216 counts 1888 pulses, a Q terminal of the flip-flop 219 is set at its high signal level. FIG. 12H illustrates a states, wherein the Q-output of the flip-flop 219 changes from its low signal level to its high level, i.e., the BD signal changes from "not ready" state to "ready state". When BD signal does not enter at all, or it is led outside its permissible range, the counter 216 produces its 1888 count output on a signal line 220. The count output passes through an "OR" circuit 221, enters into the "OR" circuit 215 to clear the counter 216, and it simultaneously clears the flip-flop 219 which detects the BD ready. As the result, the output from the flip-flop 219 assumes the low signal level indicating that the BD signal is not ready. Such BD ready signal is led outside through a terminal 222. Also, when the BD signal enters before the counter 216 counts 1856 pulses, the flip-flop 219 performs the sampling operation when the output from the flip-flop 218 is at its low signal level, on account of which its output assumes the low level. Thus, when the cycle of the BD signal is not regular, the output from the BD ready detecting flip-flop 219 assumes the low signal level, thereby detecting the "not ready" state. Although, in the foregoing, the BD permissible range is set between 1856 counts and 1888 counts, this has been determined in consideration of the jitter, etc. of the scanner, since the cycle of the BD signal is 1.875 ms. It is possible to expand or reduce this permissible range.

One input terminal 229 of the "OR" circuit 221 is applied with the power-up reset signal, and clears the counter 216 and the flip-flop when the recording apparatus is powered on.

The BD ready signal is led out to a terminal 222, passes through a gate 223 to be opened by the warm-up end signal, and is displayed by the display device 124. Then, it further enters into the BD error hold flip-flop 208. This flip-flop 208 is prohibited from clearance due to the output from the "or" circuit 207 assuming its high signal level during the printing operation. And, when the BD ready signal changes to the low level, even once, during the printing operation, the flip-flop 207 holds the signal, and leads out the BD error signal at a terminal 224. Once the BD error is detected, the print performance signal is held in a circuit (not shown), as is the case with the scanner error, whereby the output from the flip-flop 208 is withheld until the switch 209 is turned on.

When either of the scanner error signal or the BD error signal is led out, the recording apparatus stops its printing operation thereafter. On account of this, whenever misprint takes place due to error in the scanner or beam detection and the printer stops its operation, such misprinted paper is removed from the apparatus in accordance with indication of "print check" on the display device, and then the re-start button is depressed to start the printing operation again. This printer is so constructed that it sends out a data re-sending demand signal to the controller at the time of the error to obtain re-sending of the erred data.

In the foregoing, it has been explained that the counter 216 for detecting the BD ready state also performs generation of the unblanking signal, the details of which will be given hereinbelow.

In order to know that the beam which is scanning with a definite cycle has arrived at a definite position, the laser must be lighted aiming at a neighboring position where the beam detector is disposed. As soon as the beam passes through the beam detector, the laser is extinguished once, while the recording region on the photosensitive drum is illuminated with the laser in accordance with the recording signal. When the beam irradiation on the recording region is completed and a definite time has lapsed, the laser is lighted again to prepare for the subsequent beam detection. If the beam detection is not carried out with a definite cycle, there arises necessity for a function to examine the beam position with the laser remained to be lighted. This function is realized by an unblanking signal generating section. This section is made a part of the BD ready detecting section for reducing the manufacturing cost of the recording apparatus. There is a particular problem for the semiconductor laser in determining the unblanking period.

Figure 13:
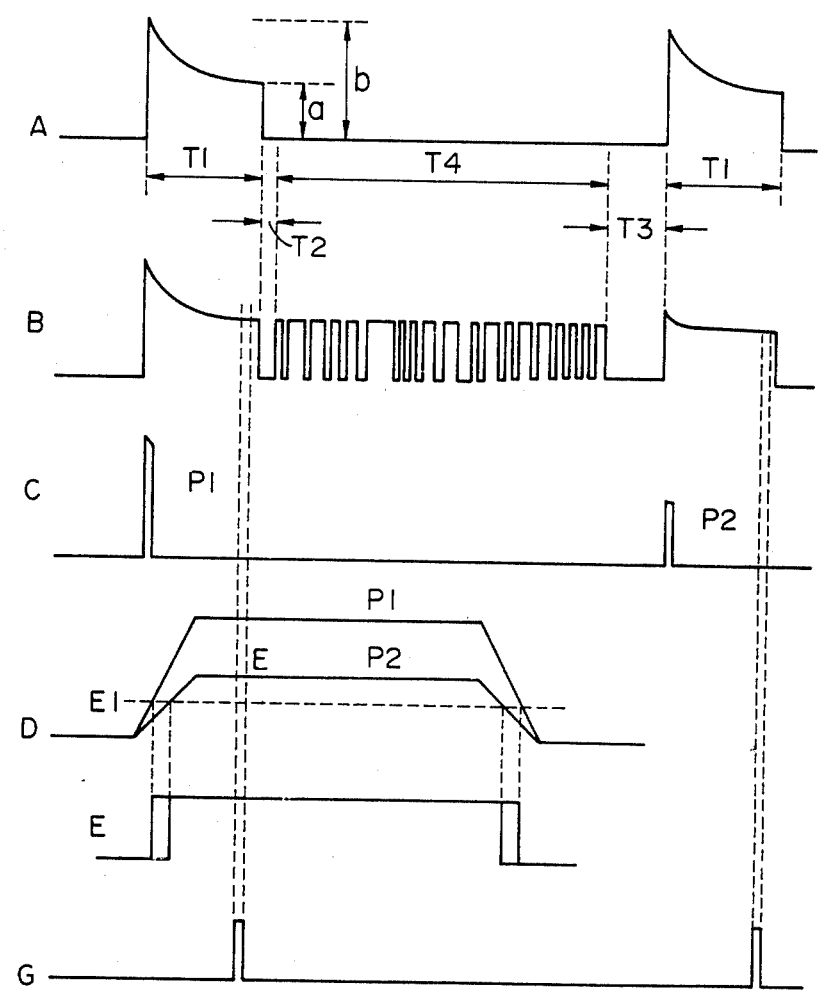

When the semiconductor laser is driven by pulse, there occur temperature variations at the junction due to heat resistance within the semiconductor laser by passage of the pulses. At the initial stage of lighting, the temperature level is low and favorable light emitting efficiency can be resulted. However, as time goes by the self-generated heat in the semiconductor laser does not escape outside but accumulate therein with the consequent increase in the temperature at the junction and lowering in the light emitting efficiency. This state is illustrated in FIG. 13. FIG. 12A shows variations in the emitted light quantity at the time of pulse operation. In the drawing, a time period T1 stands for an unblanking period, during which beam is emitted, T2 and T3 are the periods, during which no beam is emitted, and T4 is a recording region scanning period, during which beam is emitted in accordance with the recording signal. Height b of the peak becomes in some occasion several times as high as height a in the ordinary state. The ordinate indicates the light quantity of the beam. As shown in FIG. 13B, the light quantity is at its peak value during the time period T1. The peak, however, is not so remarkable during T1 subsequent to T4. This is because the temperature at the junction of the semiconductor laser has risen due to the laser emitting from the semiconductor laser during T4 in accordance with the recording signal. Therefore, when the beam position detection is performed at the initial stage of the unblanking period, there take place fluctuations in the height of the detection signals P1, P2 as shown in FIG. 13C. FIG. 13D is a comparative graphical representation, in which the time axis is exaggerated. When such signals P1, P2 are sliced with a certain definite level E1, there occurs shifting between the rising and trailing timings of the pulse as shown in FIG. 13E. In order to avoid such phenomenon, the light quantity during the unblanking period must be constant. For this purpose, it may be contemplated to automatically control the light quantity, although there is possiblilities of increase in the manufacturing cost or damage to the laser due to over-running movement of the feedback system. The jitter after the slice can be prevented without carrying out this automatic control of the light quantity, if the unblanking period is extended until the variations in the light quantity due to variations in transitional heat resistance becomes constant, and the beam position detection is performed just at the ultimate part of the unblanking period as shown in FIG. 13G. However, from the standpoint of the service life of the semi-conductor laser, the lighting time of the laser should preferably be as short as possible. The unblanking period is thus determined in consideration of the relationship as mentioned in the foregoing. Generation of this unblanking signal is done by the J-K flip-flop 217. The output from this flip-flop 217 assumes a high level as shown in FIG. 12F when the counter 216 counts 1360 pulses, and assumes a low level when the pulses are emitted from the pulse generator 214. The output from this flip-flop 217 is applied to the terminal 225 as the unblanking signal through the "OR" circuit 228, so far as the BD signal enters with a regular cycle. When the BD signal is not positioned within the BD permissible range, an output Q of the BD ready detecting flip-flop 219 assumes the high level. Therefore, if the output from this flip-flop 219 is applied to the abovementioned "OR" circuit 228, it is possible to always obtain the high level signal from the terminal 225 when the BD signal is not led out regularly. Accordingly, if the unblanking signal at the terminal 225 and the recording signal to be applied to the terminal 226 are applied to the "OR" circuit 227, and the semiconductor laser element 74 is driven by the output from this "OR" circuit 227, the laser beam can be emitted at a predetermined time interval as shown in FIG. 13 when the BD signal is regularly led out, and the laser beam can be constantly emitted when the BD signal is not led out regularly. Thus, if the apparatus is so constructed that the laser beam is constantly turned on when the BD signal is not in the preset permissible range, it is possible to obtain the BD signal without failure at any period, whereby the thus searched out BD signal can be used as the reference signal to resume the synchronous scanning of the laser beam.

Figure 11A:
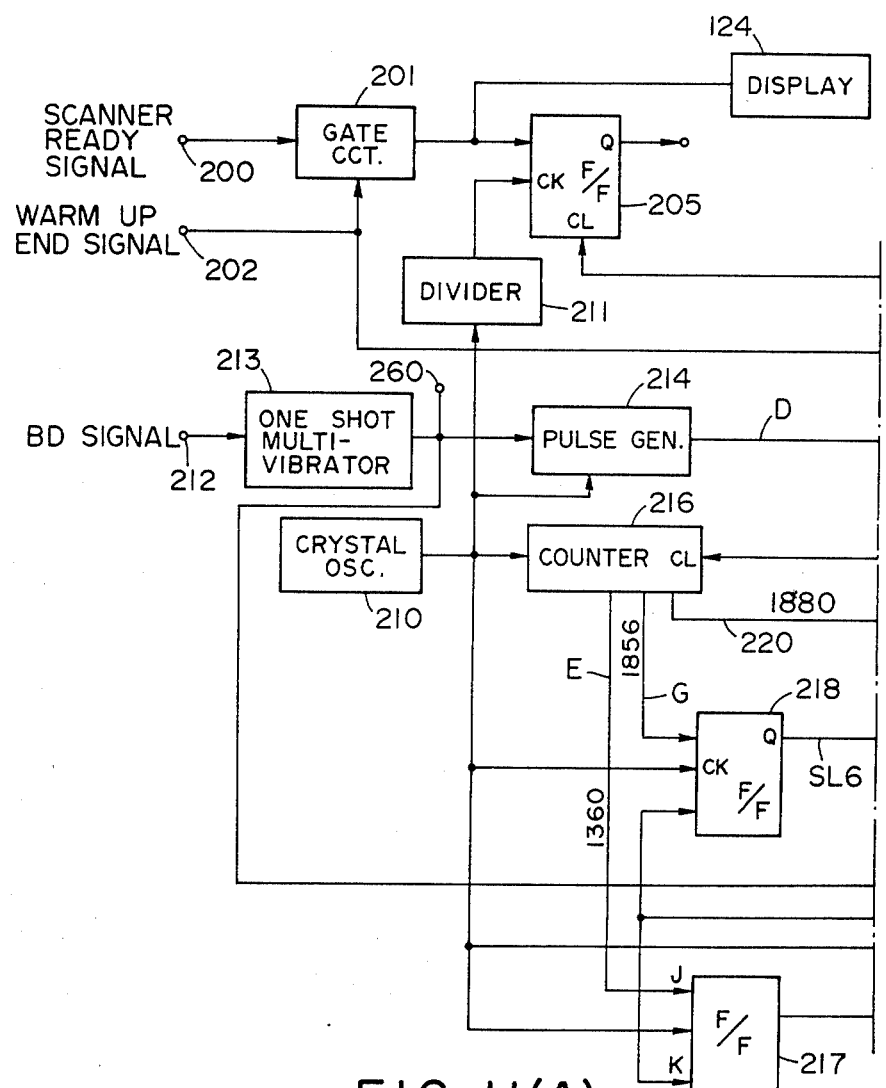
Figure 11B:
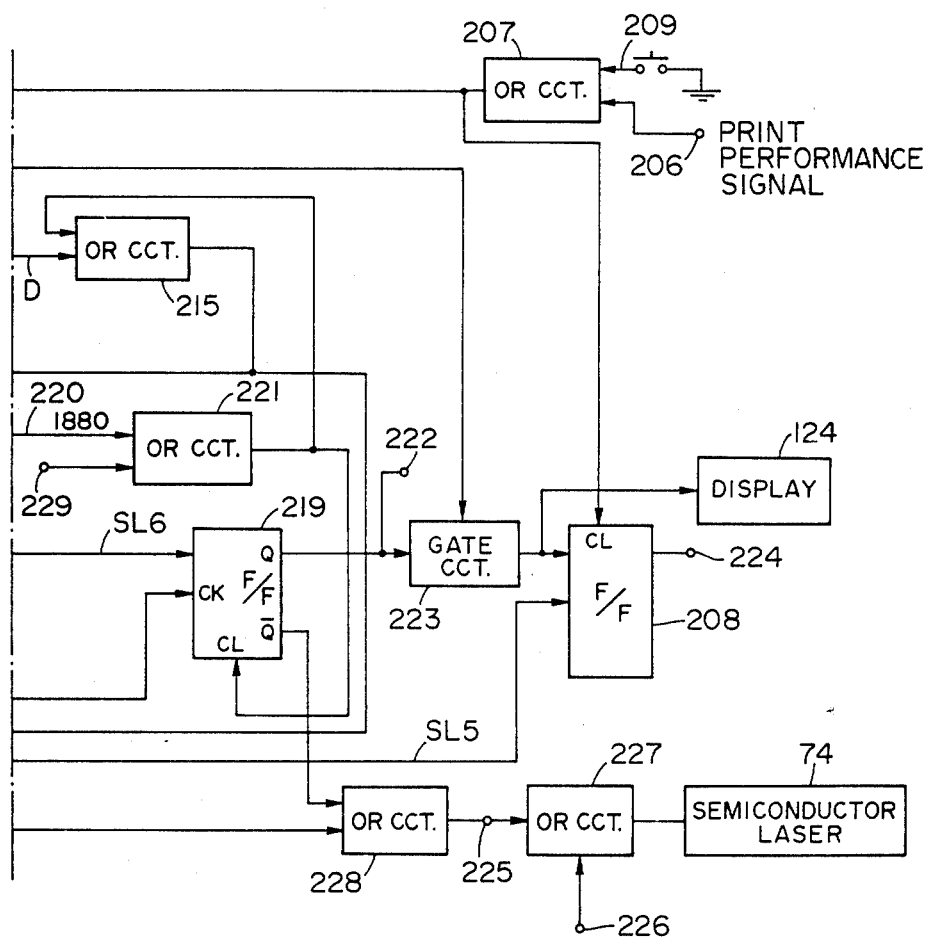
Figure 19A:
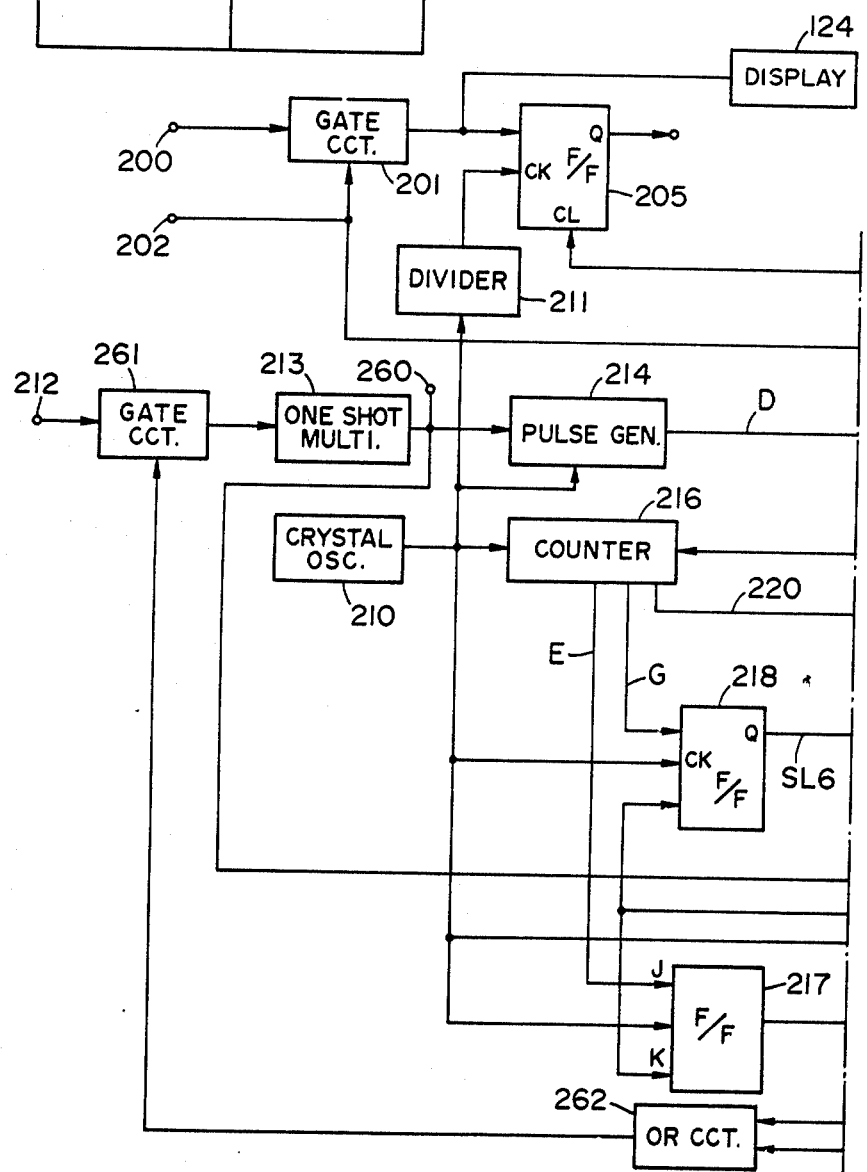
FIGS. 19A and 19B are is a block diagram showing another embodiment of the present invention.
Figure 19B:
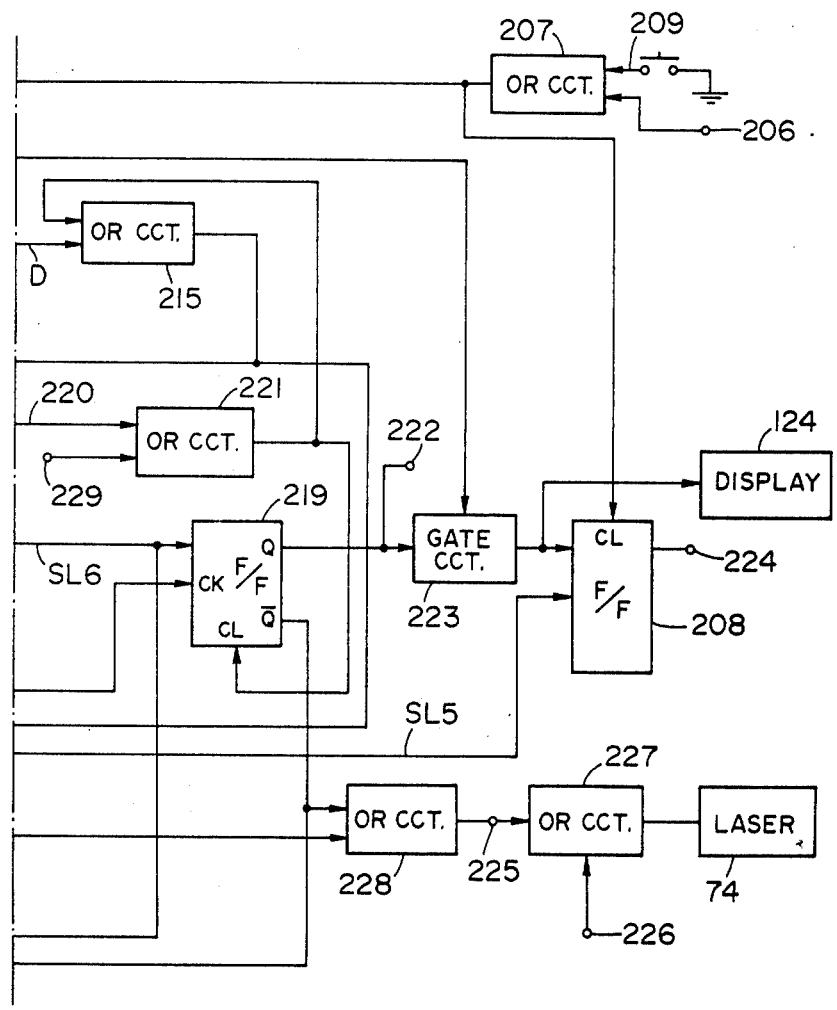

The BD signal input to the terminal 212 is shaped its signal width by the one-shot multivibrator 213, after which it is sent out of a terminal 260 to be used for taking the horizontal synchronization of the recording signal. On account of this, when noises enter into this BD signal line, there takes place shifting of the synchronization, and the resulting image becomes very unsightly. Since this BD signal posses synchronism, the subsequently detected cycle can be pre-estimated with fairly high precision, if the BD signal is once detected. The ready detection of the BD signal is done by the BD ready detection flip-flop 219 wherein this pre-estimated cycle is coincided with that of the actual input BD signal. Mere detection of whether the pre-estimated cycle is normal, or not, is of no use against shifting of synchronism due to mixing of the noises. However, when those signals having the cycle other than the pre-estimated cycle enter, if such entrance is intercepted at the input section of the signal, remarkable effect can be attained for prevention of the noise mixing. FIGS. 19A and 19B show an embodiment, in which such signal is intercepted at the input section thereof when those signals having the cycle other than the pre-estimated cycle enter therein. In this drawing, those circuits designated by the same reference numerals as in FIGS. 11A and 11B perform the same operations as those in FIGS. 11A and 11B. That is, the signal which pre-estimates the cycle is emitted from the Q-output of the flip-flop 218 as the BD permissible range signal, so that this signal is returned to the BD signal input section and applied to the gate. In other words, a gate 261 is provided at the input of the one-shot multivibrator 213, and the BD permissible range signal is introduced into this gate 261. However, when this BD permissible range signal is used, as it is, as the gate control signal for the BD signal input section, the BD signal cycle does not coincide with the counting cycle of the counter 216 when the power source is on. On account of this, the BD permissible range signal to be generated from the output of this counter 216 cannot take a synchronism with the BD signal, and the gate 261 remains in an "off" state. To avoid such situation, it becomes necessary to provide a means for compulsorily taking synchronism between them.

In the abovementioned non-synchronized state, the output $\overline{Q}$ from the ready detection flip-flop 219 assumes the high signal level, while, in its synchronized state, the output takes the low signal level. Consequently, when this output and the BD permissible range signal are applied to the "OR" circuit 262, and the output from the "OR" circuit 260 is applied to the gate 261 as the gate control signal, the gate 261 is turned on in the non-synchronized state, whereby the one-shot multivibrator can be operated whenever the BD signal arrives. On the other hand, in its synchronized state, the gate can intercept the non-synchronous noises. With such construction, the noises in the BD signal input can be intercepted, hence erroneous triggering operation of the one-shot multivibrator 213 can be eliminated. Also, since no erroneous image synchronization signal is sent out of the terminal 260, the synchronization shifting in the resulting image can be avoided.

In the afore-described recording apparatus, it becomes necessary in some occasion to integrate the number of the image transfer material used and to accurately calculate the number consumed (for example, in case the recording apparatus is rented, and the rental fee is calculated in accordance with the number of the image transfer material consumed, etc.). In such case, in order to count the number of the consumed image transfer material, it may be sufficient to count a paper feeding signal for sending the image transfer material 11 in the paper cassette 11-1 into the image conveying path by lowering the paper forwarding roller 15 in FIG. 1 by means of the counter. (Since this paper feeding signal has been well known in ordinary reproduction apparatus, detailed explanation thereof will be dispensed with.) It sometimes happen, however, that no accurate counting can be attained when the counter gets off its position or the wiring is broken. In the present embodiment, therefore, a counter inoperative signal is led out when the counter does not operate, thereby notifying the operator of its inoperability by actuating the display device by such counter inoperative signal. Or the recording operation of the recording apparatus is stopped by such signal, thereby preventing in advance such inaccurate counting.

Figure 14:
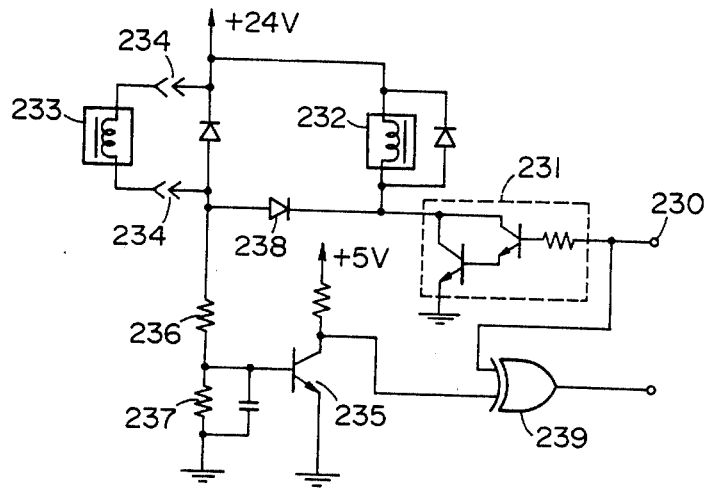
FIG. 14 is a circuit diagram showing further details of the error detector in FIG. 7.
Figure 15:
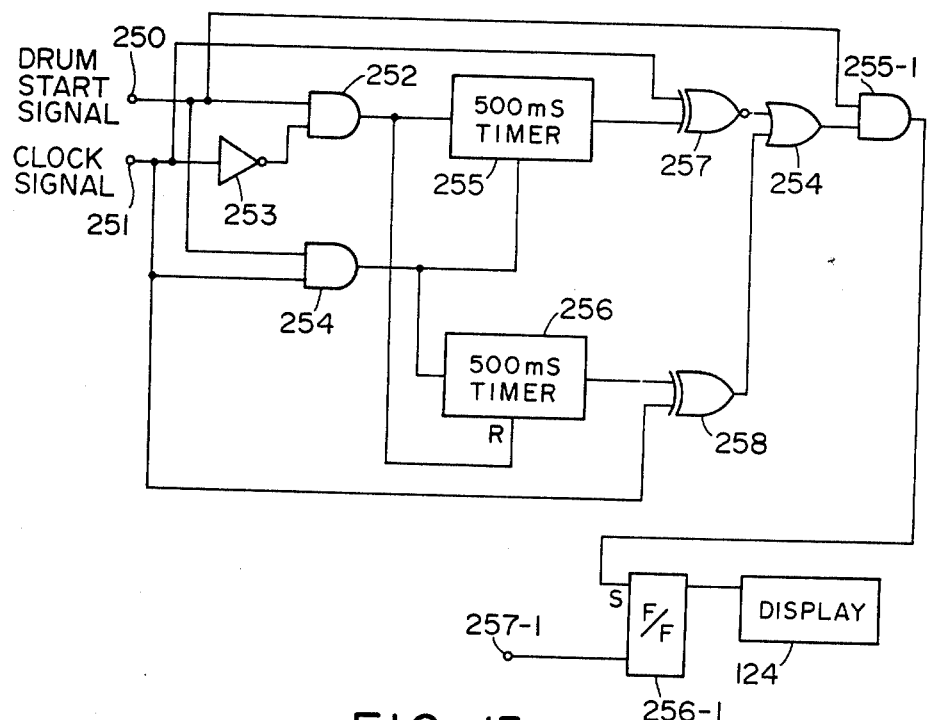
FIG. 15 is a block diagram showing further details of the error detector in FIG. 7.

FIG. 14 shows a circuit to form such counter inoperative signal, in which the paper feeding signal from a terminal 230 is applied to a driver 231. A reference numeral 232 designates a paper feeding plunger to lower the abovementioned paper feeding roller 15, and numeral 233 refers to a plunger for an electromagnetic counter to count the number of application of the paper feeding signal. Accordingly, when the paper feeding signal is applied to the terminal 230, the driver 231 is turned on, whereby electric current flows through the plungers 232, 233, the electromagnetic counter is step-forwarded, and the paper feeding roller 15 is lowered. Also, when the paper feeding signal is not applied, the driver 231 is turned off, and no electric current sufficient to drive the plungers 232, 233 flows therein.

When the counter 233 is regularly connected through a connector 234, and the driver 231 is in an "off" state, the base of a transistor 235 becomes +24 V which is substantially equal to the source voltage. On account of this, the transistor 235 is turned on and the collector assumes a low signal level. From this it is understood that the counter is regularly connected. A diode 238 is inserted for interrupting influence of the paper feeding plunger 232 on the transistor 235, because, without it, the base of the transistor 235 is inevitably affected by the paper feeding plunger 232. A problem here is that, when the paper feeding signal is emitted, the driver 231 is turned on, and the collector of the transistor 235 assumes the high signal level irrespective of whether the plunger 233 gets off its position, or not (whether the counter gets off its position, or not). In this state, it is not possible to determine whether the counter gets off its position, or not. Therefore, an exclusive logic summation with the paper feeding signal is taken by use of an exclusive "OR" circuit 239, whereby there is no possibility of erroneously recognizing that, in spite of the counter being regularly connected, the counter gets off its position only when the paper feeding signal reached.

In the above-described embodiment, the recording apparatus is so constructed that the paper feeding signal may be counted. However, it is not always necessary that such signal be counted, but a paper passage detecting switch is provided in the paper conveying path to count an output from such detecting switch.

In the recording apparatus as explained in the foregoing, the clock disc plate having a plurality of slits formed therein at an equal space interval among them is fixed onto the photosensitive drum 3 or a motor to drive the drum, and, by detecting these slits with photoelectric conversion element, etc., the drum clock is generated in synchronism with rotation of the photosensitive drum 3. However, when the motor to drive the photosensitive drum is overloaded or the motor is disconnected, generation of the drum clock is stopped and the sequence does not proceed, with the consequence that the high tension power source remains in operation or the motor gets overheated. In order to avoid this, the drum clock is constantly monitored during rotation of the motor, and, when the drum clock generation in the regular cycle is stopped, the motor current is disconnected to stop the entire operations of the printer, or any abnormality occurred in the motor is displayed, whereby the abovementioned defects can be eliminated. Further details of the clock error detection circuit which performs such function will be explained in reference to FIGS. 15 to 18.

When a drum start signal to instruct start of the drum rotation is applied to a terminal 250, the drum driving motor starts rotation, whereupon clock pulse is led out of the clock disc connected with the motor, and this clock pulse is applied to a terminal 251. In this instance, an "AND" circuit 252 assumes a high signal level by an inverter 253 when no clock pulse arrives, and an "AND" circuit 254 assumes the high level when the clock pulse arrives. The output from the "AND" circuit 252 sets a timer 255, and resets a timer 256. An output from the "AND" circuit 254 resets the timer 255, and sets a timer 256-1. The timers 255 and 256 have a time period of 500 ms, the output of which, once set, assumes the high level only during this time period. The time period of 500 ms is slightly longer than approximately two times of the regular clock cycle. The reason for this is that, at the time of the motor actuation, a certain time interval is taken until the clock pulse is generated after the drum start signal.

An exclusive "NOR" circuit 257 is to detect the clock pulse when it stops at the low level. An exclusive "OR" circuit 258 is to detect the clock pulse when it stops at the high signal level.

Figure 16:
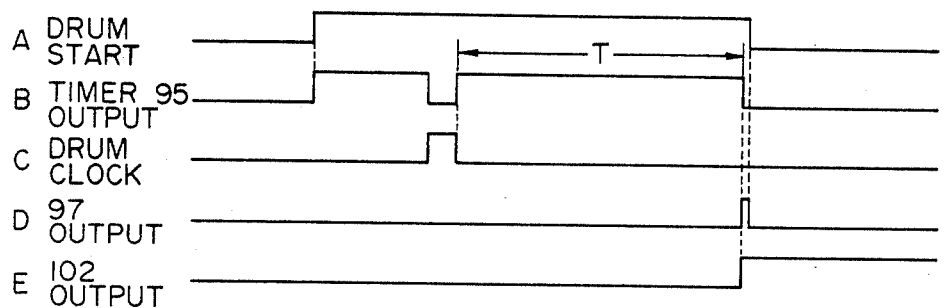
FIGS. 16 to 18 show various output waveforms at every part in FIG. 15.

FIG. 16 shows a case wherein, after the drum start signal A is led out and the drum commences its rotation, only one clock pulse C is emitted, and the clock pulse stops. The output from the timer 255 is triggered initially by the drum start signal, is cleared simultaneously with rising of the clock pulse, and is again triggered when the subsequent drum clock is trailed to assume the high level (vide FIG. 16B) When a time T for setting the timer 255 lapses without arrival of the subsequent clock, the output from the timer 255 assumes the low level, and the output from the exclusive "NOR" circuit 257 assumes the high level as shown in FIG. 16D, and passes through the "OR" circuit 254 and "AND" circuit 255 to set an S-R flip-flop 256, from which an error signal as shown in FIG. 16E is led ut. This flip-flop 256 is reset by a reset signal to be applied to the terminal 257 immediately after the power-on. The output from the flip-flop 256 is displayed in the display device 124, and led out to the terminal 258 as a stoppage signal to stop the entire operations of the recording apparatus, and the flip-flop is not reset until the power source of the recording apparatus is interrupted.

Figure 17:
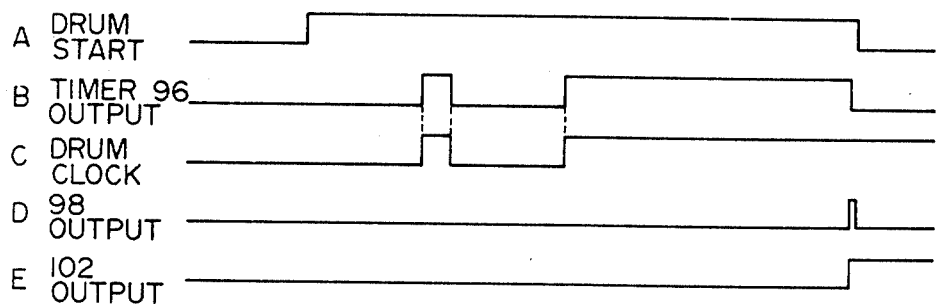

FIG. 17 shows a case, wherein the clock pulse stops when the second pulse is emitted after the drum start. The drawing further indicates that the photosensitive drum starts its rotation when the drum start signal as in FIG. 17A is emitted, and the clock pulse as in FIg. 17C is generated, whereby an output as shown in FIG. 17B can be obtained from the timer 256, and that, by applying the output from the timer 256 and the clock pulse to the exclusive "OR" circuit 258, an error detection signal as shown in FIG. 17D can be obtained from the exclusive "OR" circuit 258. Such error signal sets the flip-flop 256-1 in the same manner as explained with respect to FIG. 16.

Figure 18:
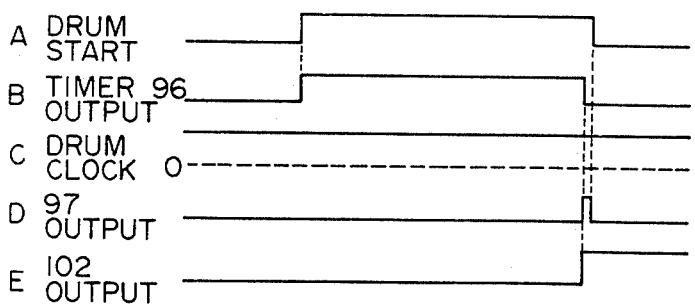

FIG. 18 is a waveform diagram showing a state of the error detection when the clock pulse stays at the high signal level, even if the drum start signal is generated. Since its operation is similar to that explained in FIG. 17, detailed explanations will be dispensed with.

Thus, the drum clock error detection circuit 118 can detect errors in both cases when the drum clock pulse is not generated, and when it is generated. Incidentally, in this embodiment, the timing of the timers 255 and 256 have been made identical. It is, however, possible that they may be made different each other.

In the foregoing embodiments of the present invention explained in reference to the drawing, explanations have been made on the recording apparatus which records informations on the recording member. It should, however, be noted that the present invention is not limited to such recording apparatus alone, but can be applied to display devices which display informations on a beam irradiated member such as screen, etc. by irradiation of beam.

What we claim is:

1. A scanning device for deflected beam, comprising:
 (a) beam forming means for forming a beam modulated by modulation signals;
 (b) deflecting means to deflect the beam generated from said beam forming means;
 (c) beam detecting means to detect that the beam deflected by said deflecting means has reached a particular position;
 (d) first driving means for periodically driving said beam forming means to periodically emit the beam from said beam forming means so that said beam detecting means can detect the modulated beam; and
 (e) second driving means to drive said beam generating means such that when said beam detecting means does not detect the beam within a predetermined period, said beam forming means is driven during a period other than said predetermined period.

2. The scanning device as claimed in claim 1, wherein said second driving means includes discriminating means to discriminate whether or not said beam detecting means detects the beam within the predetermined period, and means for applying an output from said discriminating means as a drive signal to drive said beam forming means.

3. The scanning device as claimed in claim 1, wherein said device has a counter, the output of which is applied to said first and second driving means.

4. The scanning device as claimed in claim 1, further comprising stopping means to stop the operation of said second driving means when said beam detecting means detects the beam from said beam forming means which is driven by said second driving means.

5. A beam scanning device, comprising:
(a) beam generating means to generate a beam;
(b) deflecting means to deflect the beam generated from said beam generating means;
(c) beam detecting means to detect that the beam deflected by said deflecting means has reached a particular position;
(d) counting means to count clock signals, wherein said counting means returns to its initial state upon detection of the beam through said beam detecting means; and
(e) discriminating means which discriminates whether or not said beam detecting means detects the beam between a first time instant when said counting means counts a first number and a second time instant when said counting means counts a second number which is greater than the first number, and which, when no detection is attained, so notifies the inability to detect.

6. The scanning device as claimed in claim 5, wherein said counting means is provided with returning means to return the same to its initial state when it counts the second number.

7. The scanning device as claimed in claim 6, further comprising logic means to reinstate said counting means to its initial state by a detection output from said beam detecting means and a logic output of a counted output of the second number by said counting means.

8. The scanning device as claimed in claim 5, wherein said deflecting means consists of a rotatory polygonal mirror.

9. A beam scanning device comprising:
detecting means for detecting the arrival of a beam periodically deflected to a particular position;
discriminating means for discriminating whether or not said detecting means detects the beam in a predetermined period; and
means for inhibiting signals from entering said discriminating means except for the predetermined period when said discriminating means discriminates that said detecting means detects the beam in the predetermined period, thereby preventing unnecessary information from entering said discriminating means.

10. A beam scanning device according to claim 9, further including means for releasing said inhibiting means from its function to permit entry of signals to said discriminating means when said discriminating means does not discriminate that said detecting means detects the beam in the predetermined period.

11. A beam scanning device according to claim 9, wherein said discriminating means includes counting means controlled by the output of said beam detecting means and holding means controlled by the output of said counting means.

12. A beam scanning device, comprising:
(a) beam generating means to generate a beam;
(b) deflecting means to deflect the beam generated from said beam generating means;
(c) beam detecting means to detect that the beam deflected by said deflecting means has reached a particular position;
(d) counting means responsive to the detection of the beam by said beam detecting means for counting clock signals; and
(e) discriminating means which discriminates whether or not said beam detecting means detects the beam between a first time instant when said counting means counts a first number and a second time instant when said counting means counts a second number which is greater than the first number.

13. A beam scanning device, comprising:
(a) semiconductor laser beam generating means to generate a laser beam;
(b) deflecting means to deflect the beam generated from said beam generating means;
(c) beam detecting means to detect that the beam deflected by said deflecting means has reached a particular position; and
(d) control means for controlling said semiconductor laser beam generating means to be periodically driven during a predetermined period in response to the beam deflection, and to cause the beam to pass through said beam detecting means at a time when the beam output of said semiconductor laser beam generating means is stabilized.

* * * * *